US012663516B2

(12) United States Patent
Warke et al.

(10) Patent No.: US 12,663,516 B2
(45) Date of Patent: Jun. 23, 2026

(54) IMAGING SYSTEM WITH ENHANCED SCAN RATE

(71) Applicant: SiLC Technologies, Inc., Monrovia, CA (US)

(72) Inventors: Nirmal Chindhu Warke, Saratoga, CA (US); Mehdi Asghari, La Canada Flintridge, CA (US); Majid Booloorian, San Diego, CA (US)

(73) Assignee: SiLC Technologies, Inc., Monrovia, CA (US)

( * ) Notice: Subject to any disclaimer, the term of this patent is extended or adjusted under 35 U.S.C. 154(b) by 993 days.

(21) Appl. No.: 17/861,162

(22) Filed: Jul. 8, 2022

(65) Prior Publication Data

US 2024/0012112 A1    Jan. 11, 2024

(51) Int. Cl.
*G01S 7/481*        (2006.01)
*G01S 17/42*        (2006.01)
(Continued)

(52) U.S. Cl.
CPC .......... *G01S 7/4814* (2013.01); *G01S 7/4816* (2013.01); *G01S 7/4817* (2013.01); *G01S 17/42* (2013.01); *G01S 17/58* (2013.01); *G01S 17/89* (2013.01)

(58) Field of Classification Search
USPC ....................................................... 356/5.01
See application file for complete search history.

(56) References Cited

U.S. PATENT DOCUMENTS

| | | | |
|---|---|---|---|
| 4,262,993 A | | 4/1981 | Burns et al. |
| 4,472,020 A | | 9/1984 | Evanchuk |

(Continued)

FOREIGN PATENT DOCUMENTS

| | | |
|---|---|---|
| CN | 1668939 A | 9/2005 |
| CN | 101356450 A | 1/2009 |

(Continued)

OTHER PUBLICATIONS

Aalto, Timo eta l., "VTT's Micron-Scale Silicon Rib+Strip Waveguide Platform", pp. 1-8, May 13, 2016, Conference Proceedings of SPIE Photonics Europe Conference, Proc. SPIE 9891, Silicon Photonics and Photonic Integrated Circuits V, 98911G, doi: 10.1117/12.2234588.

(Continued)

*Primary Examiner* — Yuqing Xiao
*Assistant Examiner* — Clint Thatcher
(74) *Attorney, Agent, or Firm* — Gavrilovich, Dodd & Lindsey LLP

(57)        ABSTRACT

A LIDAR system includes a signal director that can direct an outgoing LIDAR signal to any one of multiple different alternate waveguides. Each of the alternate waveguides being associated with a different switch channel in that a light signal that includes light from the outgoing LIDAR signal directed to a particular one of the alternate waveguides can be characterized as carrying the switch channel associated with that alternate waveguide. The LIDAR system is configured to output system output signals that include light from the outgoing LIDAR signals. The system output signals carry different switch channels. The LIDAR system is configured to receive system return signals that each includes light from the system output signals after an object located outside of the system has received and reflected the system output signal. A signal combiner that generates different composite signals by combining light from system return signals that carry different switch channels with a reference signal. Electronics calculate LIDAR data from the frequency of one or more of the composite signals. The LIDAR system being configured to continue to generate a composite signal that carries a first one of the switch channels for a substantial period of time after the (Continued)

imaging system has stopped outputting the system output signal that carries the first switch channel.

18 Claims, 11 Drawing Sheets

(51) Int. Cl.
  *G01S 17/58*          (2006.01)
  *G01S 17/89*          (2020.01)

(56)                    References Cited

U.S. PATENT DOCUMENTS

| | | | |
|---|---|---|---|
| 4,523,803 A | 6/1985 | Arao et al. |
| 4,786,132 A | 11/1988 | Gordon |
| 4,845,703 A | 7/1989 | Suzuki |
| 4,914,665 A | 4/1990 | Sorin |
| 4,955,028 A | 9/1990 | Alfeness et al. |
| 4,987,832 A | 1/1991 | Klink et al. |
| 4,995,720 A | 2/1991 | Amzajerdian |
| 5,041,832 A | 8/1991 | Gulczynski |
| 5,194,906 A | 3/1993 | Kimura et al. |
| 5,289,252 A | 2/1994 | Nourrcier |
| 5,305,412 A | 4/1994 | Paoli |
| 5,323,223 A | 6/1994 | Hayes |
| 5,396,328 A | 3/1995 | Jestel et al. |
| 5,500,910 A | 3/1996 | Boudreau et al. |
| 5,847,816 A | 12/1998 | Zediker et al. |
| 5,889,490 A | 3/1999 | Wachter et al. |
| 5,953,468 A | 9/1999 | Finnila et al. |
| 5,977,538 A | 11/1999 | Unger et al. |
| 5,995,810 A | 11/1999 | Karasawa |
| 6,035,083 A | 3/2000 | Brennan, III et al. |
| 6,040,898 A | 3/2000 | Mrosik et al. |
| 6,108,472 A | 8/2000 | Rickman et al. |
| 6,400,500 B1 | 6/2002 | Tidmarsh et al. |
| 6,480,513 B1 | 11/2002 | Kapany et al. |
| 6,556,759 B2 | 4/2003 | Roberts et al. |
| 6,567,573 B1 | 5/2003 | Domash et al. |
| 6,687,010 B1 | 2/2004 | Horri et al. |
| 6,921,490 B1 | 7/2005 | Qian et al. |
| 6,959,133 B2 | 10/2005 | Vancoill et al. |
| 6,970,621 B1 | 11/2005 | Fried |
| 6,977,502 B1 | 12/2005 | Hertz |
| 7,345,744 B2 | 3/2008 | Halmos et al. |
| 7,375,877 B1 | 5/2008 | Di Teodoro et al. |
| 7,535,390 B2 | 5/2009 | Hsu |
| 7,907,333 B2 | 3/2011 | Coyle |
| 8,165,433 B2 | 4/2012 | Jenkins et al. |
| 8,213,751 B1 | 7/2012 | Ho et al. |
| 8,311,374 B2 | 11/2012 | Hochberg et al. |
| 8,326,100 B2 | 12/2012 | Chen et al. |
| 8,410,566 B2 | 4/2013 | Qian et al. |
| 8,541,744 B1 | 9/2013 | Liu |
| 8,558,993 B2 | 10/2013 | Newbury et al. |
| 8,885,678 B1 | 11/2014 | Kupershmidt |
| 9,157,790 B2 | 10/2015 | Shpunt et al. |
| 9,176,282 B2 | 11/2015 | Pottier et al. |
| 9,217,831 B1 | 12/2015 | Asghari |
| 9,235,097 B2 | 1/2016 | Meade et al. |
| 9,310,471 B2 | 4/2016 | Sayyah et al. |
| 9,310,487 B2 | 4/2016 | Sakimura et al. |
| 9,519,052 B2 | 12/2016 | Gusev |
| 9,575,341 B2 | 2/2017 | Heck et al. |
| 9,606,234 B2 | 3/2017 | Major, Jr. et al. |
| 9,625,580 B2 | 4/2017 | Kotelnikov et al. |
| 9,735,885 B1 | 8/2017 | Sayyah et al. |
| 9,740,079 B1 | 8/2017 | Davids et al. |
| 9,748,726 B1 | 8/2017 | Morton et al. |
| 9,753,351 B2 | 9/2017 | Eldada |
| 9,778,363 B2 | 10/2017 | Kadambi et al. |
| 9,798,166 B1 | 10/2017 | Sharma et al. |
| 9,823,118 B2 | 11/2017 | Doylend et al. |
| 9,841,495 B2 | 12/2017 | Campbell et al. |
| 9,851,443 B2 | 12/2017 | Chen |
| 9,857,468 B1 | 1/2018 | Eichenholz et al. |
| 9,893,737 B1 | 2/2018 | Keramat et al. |
| 10,003,168 B1 | 6/2018 | Villeneuve |
| 10,007,060 B1 | 6/2018 | Qian et al. |
| 10,094,916 B1 | 10/2018 | Droz et al. |
| 10,137,903 B2 | 11/2018 | Tascione et al. |
| 10,222,474 B1 | 3/2019 | Raring et al. |
| 10,274,599 B2 | 4/2019 | Schmalenberg |
| 10,281,322 B2 | 5/2019 | Doylend et al. |
| 10,345,447 B1 | 7/2019 | Hicks |
| 10,345,497 B2 | 7/2019 | Wu et al. |
| 10,397,019 B2 | 8/2019 | Hartung et al. |
| 10,564,268 B2 | 2/2020 | Turbide et al. |
| 10,605,901 B2 | 3/2020 | Lee et al. |
| 10,627,496 B2 | 4/2020 | Schmalenberg et al. |
| 10,649,306 B2 | 5/2020 | Skirlo et al. |
| 10,739,256 B1 | 8/2020 | Rickman et al. |
| 10,761,195 B2 | 9/2020 | Donovan |
| 10,782,782 B1 | 9/2020 | DeSalvo et al. |
| 10,788,582 B2 | 9/2020 | Feng et al. |
| 10,816,649 B1 | 10/2020 | Keyser et al. |
| 10,845,480 B1 | 11/2020 | Shah et al. |
| 10,901,074 B1 | 1/2021 | Pan et al. |
| 10,962,713 B2 | 3/2021 | Lee |
| 11,022,683 B1 | 6/2021 | Rezk |
| 11,067,668 B1 | 7/2021 | Bravo |
| 11,114,815 B1 | 9/2021 | Chen et al. |
| 11,119,219 B1 | 9/2021 | LaChapelle et al. |
| 11,162,789 B2 | 11/2021 | Lodin et al. |
| 11,170,476 B1 | 11/2021 | Toshiwal et al. |
| 11,175,388 B1 | 11/2021 | Wood et al. |
| 11,221,404 B1 | 1/2022 | DeSalvo et al. |
| 11,300,683 B2 | 4/2022 | Bao et al. |
| 11,378,691 B2 | 7/2022 | Boloorian et al. |
| 11,448,729 B2 | 9/2022 | Baba et al. |
| 11,454,724 B2 | 9/2022 | Michaels et al. |
| 11,486,975 B1 | 11/2022 | Xiao |
| 11,493,753 B1 | 11/2022 | Wood et al. |
| 11,525,916 B2 | 12/2022 | Avci et al. |
| 11,536,805 B2 | 12/2022 | Asghari et al. |
| 11,579,300 B1 | 2/2023 | Li |
| 11,635,491 B2 | 4/2023 | Asghari et al. |
| 11,714,167 B2 | 8/2023 | Feng et al. |
| 11,768,419 B1 | 9/2023 | Schroder et al. |
| 11,815,720 B1 | 11/2023 | Tavallaee et al. |
| 11,908,075 B2 | 2/2024 | Gorantla |
| 12,210,122 B2 * | 1/2025 | Druml .................. G01S 7/4911 |
| 2002/0031304 A1 | 3/2002 | Roberts et al. |
| 2002/0105632 A1 | 8/2002 | Holton |
| 2002/0122398 A1 | 9/2002 | Jou |
| 2002/0159700 A1 | 10/2002 | Coroy et al. |
| 2003/0030582 A1 | 2/2003 | Vickers |
| 2003/0031407 A1 | 2/2003 | Weisberg et al. |
| 2003/0142943 A1 | 7/2003 | Yegnanarayanan et al. |
| 2003/0183603 A1 | 10/2003 | Forsman et al. |
| 2003/0212520 A1 | 11/2003 | Campos et al. |
| 2003/0231686 A1 | 12/2003 | Liu |
| 2004/0081388 A1 | 4/2004 | Koyama |
| 2004/0085612 A1 | 5/2004 | Livingston et al. |
| 2004/0233964 A1 | 11/2004 | Yamanaka et al. |
| 2004/0249561 A1 | 12/2004 | Capozzi et al. |
| 2005/0123227 A1 | 6/2005 | Vonsovici et al. |
| 2005/0135730 A1 | 6/2005 | Welch et al. |
| 2005/0213103 A1 | 9/2005 | Everett et al. |
| 2005/0219068 A1 | 10/2005 | Jones et al. |
| 2005/0237617 A1 | 10/2005 | Carr et al. |
| 2005/0244103 A1 | 11/2005 | Kwakernaak |
| 2006/0114447 A1 | 6/2006 | Harris et al. |
| 2006/0232763 A1 | 10/2006 | Jokinen |
| 2007/0024849 A1 | 2/2007 | Carrig et al. |
| 2007/0024956 A1 | 2/2007 | Coyle |
| 2007/0036486 A1 | 2/2007 | Miyadera et al. |
| 2007/0103362 A1 | 5/2007 | Arikan et al. |
| 2007/0171407 A1 | 7/2007 | Cole et al. |
| 2007/0223856 A1 | 9/2007 | Nunoya et al. |
| 2008/0088184 A1 | 4/2008 | Tung et al. |
| 2008/0123170 A1 | 5/2008 | Reichert et al. |
| 2008/0174461 A1 | 7/2008 | Hsu |
| 2008/0176681 A1 | 7/2008 | Donahoe |

(56) References Cited

U.S. PATENT DOCUMENTS

| | | |
|---|---|---|
| 2008/0181550 A1 | 7/2008 | Earnshaw |
| 2008/0205461 A1 | 8/2008 | Henrichs |
| 2009/0046746 A1 | 2/2009 | Munroe et al. |
| 2009/0128797 A1 | 5/2009 | Walsh |
| 2009/0195769 A1 | 8/2009 | Luo et al. |
| 2009/0279070 A1 | 11/2009 | Ueno |
| 2010/0027379 A1 | 2/2010 | Saulnier et al. |
| 2010/0085992 A1 | 4/2010 | Rakuljic et al. |
| 2010/0159858 A1 | 6/2010 | Dent et al. |
| 2010/0187442 A1 | 7/2010 | Hochberg et al. |
| 2010/0271614 A1 | 10/2010 | Albuquerque et al. |
| 2010/0277714 A1 | 11/2010 | Pedersen et al. |
| 2010/0280765 A1 | 11/2010 | Marquardt et al. |
| 2010/0296077 A1 | 11/2010 | Scott et al. |
| 2010/0309391 A1 | 12/2010 | Plut |
| 2011/0026643 A1 | 2/2011 | Ruelke et al. |
| 2011/0068425 A1 | 3/2011 | Liao et al. |
| 2011/0068426 A1 | 3/2011 | Zheng et al. |
| 2011/0091155 A1 | 4/2011 | Yilmaz et al. |
| 2011/0095167 A1 | 4/2011 | Feng et al. |
| 2011/0141471 A1 | 6/2011 | Schlotterbeck et al. |
| 2011/0164845 A1 | 7/2011 | Jenkins et al. |
| 2011/0241895 A1 | 10/2011 | Griffin |
| 2012/0038506 A1 | 2/2012 | Kanamoto et al. |
| 2012/0062230 A1 | 3/2012 | Vaughan, Jr. et al. |
| 2012/0081786 A1 | 4/2012 | Mizuyama et al. |
| 2012/0098935 A1 | 4/2012 | Schmidt et al. |
| 2012/0120382 A1 | 5/2012 | Silny et al. |
| 2012/0182544 A1 | 7/2012 | Asahara et al. |
| 2012/0206712 A1 | 8/2012 | Chang et al. |
| 2013/0044309 A1 | 2/2013 | Dakin et al. |
| 2013/0044311 A1 | 2/2013 | Rakuljic |
| 2013/0051655 A1 | 2/2013 | Collard et al. |
| 2013/0056623 A1 | 3/2013 | Lipson et al. |
| 2013/0083389 A1 | 4/2013 | Dakin et al. |
| 2013/0094074 A1 | 4/2013 | Asghari et al. |
| 2013/0162976 A1 | 6/2013 | Dakin et al. |
| 2013/0206967 A1 | 8/2013 | Shpunt et al. |
| 2013/0242400 A1 | 9/2013 | Chen |
| 2013/0321791 A1 | 12/2013 | Feldkhun et al. |
| 2014/0035776 A1 | 2/2014 | Sochen et al. |
| 2014/0036252 A1 | 2/2014 | Amzajerdian et al. |
| 2014/0054451 A1 | 2/2014 | Abedin et al. |
| 2014/0112357 A1 | 4/2014 | Abedin et al. |
| 2014/0133864 A1 | 5/2014 | Asghari et al. |
| 2014/0153931 A1 | 6/2014 | Doerr |
| 2014/0169392 A1 | 6/2014 | Kim |
| 2014/0211298 A1 | 7/2014 | Sayyah et al. |
| 2014/0269790 A1 | 9/2014 | Sebastian et al. |
| 2014/0332918 A1 | 11/2014 | Li et al. |
| 2014/0376000 A1 | 12/2014 | Swanson et al. |
| 2014/0376001 A1 | 12/2014 | Swanson |
| 2015/0055115 A1 | 2/2015 | Pedersen et al. |
| 2015/0056740 A1 | 2/2015 | Menezo |
| 2015/0109603 A1 | 4/2015 | Kim et al. |
| 2015/0171593 A1 | 6/2015 | Duan et al. |
| 2015/0177367 A1 | 6/2015 | Sebastian et al. |
| 2015/0177383 A1 | 6/2015 | Ruff et al. |
| 2015/0185244 A1 | 7/2015 | Inoue et al. |
| 2015/0207296 A1 | 7/2015 | Rickman et al. |
| 2015/0333480 A1 | 11/2015 | Santis et al. |
| 2015/0346340 A1 | 12/2015 | Yaacobi et al. |
| 2015/0378012 A1 | 12/2015 | Sayyah et al. |
| 2015/0378187 A1 | 12/2015 | Heck et al. |
| 2016/0084945 A1 | 3/2016 | Rodrigo et al. |
| 2016/0161600 A1 | 6/2016 | Eldada et al. |
| 2016/0170141 A1 | 6/2016 | Luo et al. |
| 2016/0209594 A1 | 7/2016 | Bahl |
| 2016/0223663 A1 | 8/2016 | Schmalenberg et al. |
| 2016/0261091 A1 | 9/2016 | Santis et al. |
| 2016/0274226 A1 | 9/2016 | Lewis |
| 2016/0290891 A1 | 10/2016 | Feng et al. |
| 2016/0291135 A1 | 10/2016 | Ando et al. |
| 2016/0299228 A1 | 10/2016 | Maleki et al. |
| 2016/0306043 A1 | 10/2016 | Moss et al. |
| 2016/0324438 A1 | 11/2016 | Halpern et al. |
| 2016/0341818 A1 | 11/2016 | Gilliland et al. |
| 2016/0373191 A1 | 12/2016 | Fathololoumi et al. |
| 2016/0377721 A1 | 12/2016 | Lardin et al. |
| 2017/0003451 A1 | 1/2017 | Ma et al. |
| 2017/0040775 A1 | 2/2017 | Takabayashi et al. |
| 2017/0059779 A1 | 3/2017 | Okayama |
| 2017/0067985 A1 | 3/2017 | Schwarz et al. |
| 2017/0098917 A1 | 4/2017 | Popovic et al. |
| 2017/0108649 A1 | 4/2017 | Dallessasse et al. |
| 2017/0139411 A1 | 5/2017 | Hartung et al. |
| 2017/0146639 A1 | 5/2017 | Carothers |
| 2017/0146641 A1 | 5/2017 | Walsh et al. |
| 2017/0153319 A1 | 6/2017 | Villeneuve et al. |
| 2017/0155225 A1 | 6/2017 | Villeneuve et al. |
| 2017/0184450 A1 | 6/2017 | Doylend et al. |
| 2017/0207600 A1 | 7/2017 | Klamkin et al. |
| 2017/0268866 A1 | 9/2017 | Berz |
| 2017/0269198 A1 | 9/2017 | Hall et al. |
| 2017/0269215 A1 | 9/2017 | Hall et al. |
| 2017/0299697 A1 | 10/2017 | Swanson |
| 2017/0307648 A1 | 10/2017 | Kotake et al. |
| 2017/0307736 A1 | 10/2017 | Donovan |
| 2017/0328988 A1 | 11/2017 | Magee et al. |
| 2017/0343652 A1 | 11/2017 | de Mersseman et al. |
| 2017/0343791 A1 | 11/2017 | Swanson |
| 2017/0350965 A1 | 12/2017 | Schmalenberg |
| 2017/0350983 A1 | 12/2017 | Hall et al. |
| 2017/0356983 A1 | 12/2017 | Jeong et al. |
| 2017/0371227 A1 | 12/2017 | Skirlo et al. |
| 2017/0372602 A1 | 12/2017 | Gilliland et al. |
| 2018/0003805 A1 | 1/2018 | Popovich et al. |
| 2018/0024232 A1 | 1/2018 | Gilliland et al. |
| 2018/0024246 A1 | 1/2018 | Jeong et al. |
| 2018/0031680 A1 | 2/2018 | Lee et al. |
| 2018/0039154 A1 | 2/2018 | Hashemi et al. |
| 2018/0050704 A1 | 2/2018 | Tascione et al. |
| 2018/0073932 A1 | 3/2018 | Minet et al. |
| 2018/0088211 A1 | 3/2018 | Gill et al. |
| 2018/0095284 A1 | 4/2018 | Welch et al. |
| 2018/0102442 A1 | 4/2018 | Wang et al. |
| 2018/0103431 A1 | 4/2018 | Suh et al. |
| 2018/0113216 A1 | 4/2018 | Kremer et al. |
| 2018/0120433 A1 | 5/2018 | Eichenholz et al. |
| 2018/0120436 A1 | 5/2018 | Smits |
| 2018/0136321 A1 | 5/2018 | Verghese et al. |
| 2018/0143322 A1 | 5/2018 | Rosenzweig et al. |
| 2018/0143374 A1 | 5/2018 | Coolbaugh et al. |
| 2018/0149752 A1 | 5/2018 | Tadano |
| 2018/0164408 A1 | 6/2018 | Hall et al. |
| 2018/0172918 A1 | 6/2018 | Lane et al. |
| 2018/0188371 A1 | 7/2018 | Bao et al. |
| 2018/0217471 A1 | 8/2018 | Lee et al. |
| 2018/0224547 A1 | 8/2018 | Crouch et al. |
| 2018/0231643 A1 | 8/2018 | Lee et al. |
| 2018/0269890 A1 | 9/2018 | Ojeda |
| 2018/0287343 A1 | 10/2018 | Morrison et al. |
| 2018/0306925 A1 | 10/2018 | Hosseini et al. |
| 2018/0329037 A1 | 11/2018 | Bozchalooi et al. |
| 2018/0331493 A1 | 11/2018 | Lin et al. |
| 2018/0351317 A1 | 12/2018 | Vermeulen |
| 2018/0356344 A1 | 12/2018 | Yi |
| 2018/0356522 A1 | 12/2018 | Kikuchi et al. |
| 2018/0359033 A1 | 12/2018 | Xu et al. |
| 2018/0364334 A1 | 12/2018 | Xiang et al. |
| 2018/0364336 A1 | 12/2018 | Hosseini et al. |
| 2018/0372517 A1 | 12/2018 | Yao et al. |
| 2018/0372530 A1 | 12/2018 | Welle et al. |
| 2018/0372870 A1 | 12/2018 | Puglia |
| 2018/0375284 A1 | 12/2018 | Permogorov |
| 2019/0004151 A1 | 1/2019 | Abediasl et al. |
| 2019/0011558 A1 | 1/2019 | Crouch et al. |
| 2019/0011559 A1 | 1/2019 | Desai et al. |
| 2019/0018110 A1 | 1/2019 | Kremer et al. |
| 2019/0018121 A1 | 1/2019 | Sayyah et al. |
| 2019/0018139 A1 | 1/2019 | Sayyah et al. |
| 2019/0018140 A1 | 1/2019 | Sarkissian et al. |
| 2019/0018144 A1 | 1/2019 | Imaki et al. |
| 2019/0018197 A1 | 1/2019 | Boutami et al. |

(56) References Cited

U.S. PATENT DOCUMENTS

| | | |
|---|---|---|
| 2019/0025094 A1 | 1/2019 | Lewis et al. |
| 2019/0025426 A1 | 1/2019 | Satyan et al. |
| 2019/0025431 A1 | 1/2019 | Satyan et al. |
| 2019/0027897 A1 | 1/2019 | Wei et al. |
| 2019/0033453 A1 | 1/2019 | Crouch et al. |
| 2019/0049569 A1 | 2/2019 | Kim et al. |
| 2019/0064329 A1 | 2/2019 | Liu et al. |
| 2019/0064332 A1 | 2/2019 | Schmalenberg et al. |
| 2019/0064358 A1 | 2/2019 | Desai et al. |
| 2019/0072651 A1 | 3/2019 | Halmos et al. |
| 2019/0072672 A1 | 3/2019 | Yao |
| 2019/0086514 A1 | 3/2019 | Dussan et al. |
| 2019/0086518 A1 | 3/2019 | Halstig et al. |
| 2019/0086550 A1 | 3/2019 | Dussan et al. |
| 2019/0096259 A1 | 3/2019 | McQuillen et al. |
| 2019/0101647 A1 | 4/2019 | Feshali et al. |
| 2019/0107623 A1 | 4/2019 | Campbell et al. |
| 2019/0120939 A1 | 4/2019 | O'Keeffe |
| 2019/0146074 A1 | 5/2019 | Hjelmstad |
| 2019/0146087 A1 | 5/2019 | Mansur et al. |
| 2019/0146164 A1 | 5/2019 | Krichevsky |
| 2019/0154816 A1 | 5/2019 | Hughes et al. |
| 2019/0154832 A1 | 5/2019 | Maleki et al. |
| 2019/0154835 A1 | 5/2019 | Maleki et al. |
| 2019/0179012 A1 | 6/2019 | Heo |
| 2019/0187269 A1 | 6/2019 | Tong et al. |
| 2019/0204419 A1 | 7/2019 | Baba et al. |
| 2019/0204441 A1 | 7/2019 | Feneyrou et al. |
| 2019/0204443 A1 | 7/2019 | Yao et al. |
| 2019/0250253 A1 | 8/2019 | Hung et al. |
| 2019/0250396 A1 | 8/2019 | Blanche et al. |
| 2019/0257924 A1 | 8/2019 | Li et al. |
| 2019/0257927 A1 | 8/2019 | Yao |
| 2019/0271767 A1* | 9/2019 | Keilaf ................... G01S 17/931 |
| 2019/0280453 A1 | 9/2019 | Gopinath et al. |
| 2019/0293794 A1 | 9/2019 | Zhang et al. |
| 2019/0302262 A1 | 10/2019 | Singer |
| 2019/0302268 A1 | 10/2019 | Singer et al. |
| 2019/0310372 A1 | 10/2019 | Crouch et al. |
| 2019/0310377 A1 | 10/2019 | Lodin et al. |
| 2019/0317195 A1 | 10/2019 | Sun et al. |
| 2019/0331797 A1 | 10/2019 | Singer et al. |
| 2019/0339388 A1 | 11/2019 | Crouch et al. |
| 2019/0339389 A1 | 11/2019 | Russo et al. |
| 2019/0341739 A1 | 11/2019 | Loh et al. |
| 2019/0346056 A1 | 11/2019 | Staiger et al. |
| 2019/0346568 A1 | 11/2019 | Feng et al. |
| 2019/0353787 A1 | 11/2019 | Petit |
| 2019/0353789 A1 | 11/2019 | Boloorian et al. |
| 2019/0353977 A1 | 11/2019 | Hung |
| 2019/0361122 A1 | 11/2019 | Crouch et al. |
| 2019/0369244 A1 | 12/2019 | Asghari et al. |
| 2019/0369251 A1 | 12/2019 | Feng et al. |
| 2019/0372307 A1 | 12/2019 | Morton |
| 2019/0383907 A1 | 12/2019 | Belsley et al. |
| 2019/0391242 A1 | 12/2019 | Asghari et al. |
| 2019/0391243 A1 | 12/2019 | Nicolaescu |
| 2020/0018857 A1 | 1/2020 | Feng et al. |
| 2020/0021082 A1 | 1/2020 | Rakuljic |
| 2020/0025898 A1 | 1/2020 | Ain-Kedem et al. |
| 2020/0025926 A1 | 1/2020 | Asghari et al. |
| 2020/0043176 A1 | 2/2020 | Maila et al. |
| 2020/0049799 A1 | 2/2020 | Ando et al. |
| 2020/0057143 A1 | 2/2020 | Asghari et al. |
| 2020/0064116 A1 | 2/2020 | Salvade et al. |
| 2020/0064477 A1 | 2/2020 | Komatsuzaki |
| 2020/0072978 A1 | 3/2020 | Boloorian et al. |
| 2020/0072979 A1 | 3/2020 | Boloorian et al. |
| 2020/0076152 A1 | 3/2020 | Eichenholz et al. |
| 2020/0088876 A1 | 3/2020 | Tanemura et al. |
| 2020/0103501 A1 | 4/2020 | Kotelnikov et al. |
| 2020/0104647 A1 | 4/2020 | Pirim |
| 2020/0110179 A1 | 4/2020 | Talty et al. |
| 2020/0116837 A1 | 4/2020 | Asghari et al. |
| 2020/0116842 A1 | 4/2020 | Asghari et al. |
| 2020/0116863 A1 | 4/2020 | Jensen et al. |
| 2020/0132849 A1* | 4/2020 | Moebius ............... G01S 13/867 |
| 2020/0142065 A1 | 5/2020 | Boloorian et al. |
| 2020/0142066 A1 | 5/2020 | Sandborn et al. |
| 2020/0142068 A1 | 5/2020 | Crouch et al. |
| 2020/0150241 A1 | 5/2020 | Byrnes et al. |
| 2020/0158830 A1 | 5/2020 | Asghari et al. |
| 2020/0158833 A1 | 5/2020 | Baba et al. |
| 2020/0158839 A1 | 5/2020 | Lin et al. |
| 2020/0166617 A1 | 5/2020 | Crouch et al. |
| 2020/0166647 A1 | 5/2020 | Crouch et al. |
| 2020/0174095 A1 | 6/2020 | Altintas et al. |
| 2020/0182973 A1 | 6/2020 | Luff et al. |
| 2020/0182978 A1 | 6/2020 | Maleki et al. |
| 2020/0200879 A1 | 6/2020 | Halstig et al. |
| 2020/0209366 A1 | 7/2020 | Maleki |
| 2020/0225332 A1 | 7/2020 | Wagner et al. |
| 2020/0241119 A1 | 7/2020 | Asghari et al. |
| 2020/0249324 A1 | 8/2020 | Steinberg et al. |
| 2020/0249350 A1 | 8/2020 | Schmalenberg |
| 2020/0256956 A1 | 8/2020 | Luff et al. |
| 2020/0278432 A1 | 9/2020 | Thorpe et al. |
| 2020/0284879 A1 | 9/2020 | Asghari et al. |
| 2020/0284883 A1 | 9/2020 | Ferreira et al. |
| 2020/0284913 A1 | 9/2020 | Amelot et al. |
| 2020/0292706 A1 | 9/2020 | Hexsel et al. |
| 2020/0300980 A1 | 9/2020 | Behzadi et al. |
| 2020/0300993 A1 | 9/2020 | Behzadi et al. |
| 2020/0301070 A1 | 9/2020 | Nagarajan |
| 2020/0309949 A1 | 10/2020 | Feng et al. |
| 2020/0309952 A1 | 10/2020 | Imaki et al. |
| 2020/0319409 A1 | 10/2020 | Su et al. |
| 2020/0326476 A1 | 10/2020 | Hiratani |
| 2020/0333441 A1 | 10/2020 | Diaz |
| 2020/0333443 A1 | 10/2020 | Boloorian et al. |
| 2020/0333533 A1 | 10/2020 | Rogers et al. |
| 2020/0363515 A1 | 11/2020 | Luff et al. |
| 2020/0373662 A1* | 11/2020 | Gleason ................. G01S 17/88 |
| 2020/0400821 A1 | 12/2020 | Baker et al. |
| 2020/0400822 A1 | 12/2020 | Ando et al. |
| 2020/0408911 A1 | 12/2020 | Boloorian et al. |
| 2020/0408912 A1 | 12/2020 | Boloorian et al. |
| 2021/0010802 A1 | 1/2021 | Onohara et al. |
| 2021/0033732 A1 | 2/2021 | Boloorian et al. |
| 2021/0055388 A1 | 2/2021 | Feng et al. |
| 2021/0063541 A1 | 3/2021 | Zheng et al. |
| 2021/0063542 A1 | 3/2021 | Zheng et al. |
| 2021/0072385 A1 | 3/2021 | Sandborn et al. |
| 2021/0072389 A1 | 3/2021 | Boloorian et al. |
| 2021/0072445 A1 | 3/2021 | Kurokawa et al. |
| 2021/0096228 A1 | 4/2021 | Behzadi et al. |
| 2021/0109195 A1 | 4/2021 | Feng et al. |
| 2021/0116778 A1 | 4/2021 | Zhang et al. |
| 2021/0132232 A1 | 5/2021 | Asghari et al. |
| 2021/0141058 A1 | 5/2021 | Piggott et al. |
| 2021/0149056 A1 | 5/2021 | Luff et al. |
| 2021/0156999 A1 | 5/2021 | Nishino et al. |
| 2021/0159659 A1 | 5/2021 | Bandyopadhyay et al. |
| 2021/0159664 A1 | 5/2021 | Liu et al. |
| 2021/0165102 A1 | 6/2021 | Crouch et al. |
| 2021/0173058 A1 | 6/2021 | Viswanatha et al. |
| 2021/0181320 A1 | 6/2021 | Oza et al. |
| 2021/0190907 A1 | 6/2021 | Sahara |
| 2021/0190921 A1 | 6/2021 | Golikov et al. |
| 2021/0190925 A1 | 6/2021 | Asghari et al. |
| 2021/0199797 A1 | 7/2021 | Choi et al. |
| 2021/0239811 A1 | 8/2021 | Asghari et al. |
| 2021/0255324 A1 | 8/2021 | Dunn et al. |
| 2021/0278540 A1 | 9/2021 | Maayan et al. |
| 2021/0293923 A1 | 9/2021 | Arkind et al. |
| 2021/0316756 A1* | 10/2021 | Davydenko ........... G01S 7/4817 |
| 2021/0318436 A1 | 10/2021 | Boloorian et al. |
| 2021/0325520 A1 | 10/2021 | Cai et al. |
| 2021/0333386 A1 | 10/2021 | Park et al. |
| 2021/0349196 A1 | 11/2021 | Wang et al. |
| 2021/0349216 A1 | 11/2021 | Behroozpour et al. |
| 2021/0356592 A1 | 11/2021 | Behroozpour |
| 2021/0364607 A1 | 11/2021 | Davydenko |
| 2021/0373137 A1* | 12/2021 | Tan ......................... G01S 7/497 |

(56) References Cited

U.S. PATENT DOCUMENTS

| | | | |
|---|---|---|---|
| 2021/0373162 A1 | 12/2021 | Wu et al. | |
| 2021/0389244 A1 | 12/2021 | Bowman et al. | |
| 2021/0396879 A1 | 12/2021 | Sun et al. | |
| 2021/0405194 A1 | 12/2021 | Tsuchida | |
| 2022/0003842 A1 | 1/2022 | Wang et al. | |
| 2022/0050187 A1 | 2/2022 | Yao | |
| 2022/0065999 A1 | 3/2022 | Phare et al. | |
| 2022/0075121 A1 | 3/2022 | Lowder et al. | |
| 2022/0085567 A1 | 3/2022 | Lowder et al. | |
| 2022/0099837 A1 | 3/2022 | Crouch et al. | |
| 2022/0107411 A1 | 4/2022 | Koonath et al. | |
| 2022/0113390 A1 | 4/2022 | Koonath et al. | |
| 2022/0113422 A1 | 4/2022 | Hillard et al. | |
| 2022/0121080 A1 | 4/2022 | Yao | |
| 2022/0179055 A1 | 6/2022 | Ferrara et al. | |
| 2022/0187457 A1 | 6/2022 | Daami et al. | |
| 2022/0187458 A1 | 6/2022 | Piggott et al. | |
| 2022/0187463 A1 | 6/2022 | Maheshwari et al. | |
| 2022/0196814 A1 | 6/2022 | Lin et al. | |
| 2022/0206164 A1 | 6/2022 | Takada | |
| 2022/0244360 A1 | 8/2022 | Phare et al. | |
| 2022/0283389 A1 | 9/2022 | Yang et al. | |
| 2022/0291361 A1 | 9/2022 | Asghari et al. | |
| 2022/0308192 A1 | 9/2022 | John et al. | |
| 2022/0334225 A1 | 10/2022 | Davydenko et al. | |
| 2022/0342048 A1 | 10/2022 | Asghari et al. | |
| 2022/0365214 A1 | 11/2022 | Sandborn et al. | |
| 2022/0373667 A1 | 11/2022 | Khatana et al. | |
| 2022/0373739 A1 | 11/2022 | Abril et al. | |
| 2022/0404470 A1 | 12/2022 | Asghari et al. | |
| 2022/0413100 A1 | 12/2022 | Jain | |
| 2022/0413143 A1 | 12/2022 | Parsa et al. | |
| 2023/0027271 A1 | 1/2023 | Jin et al. | |
| 2023/0069201 A1 | 3/2023 | Asghari et al. | |
| 2023/0104453 A1 | 4/2023 | Asghari et al. | |
| 2023/0194952 A1 | 6/2023 | Muranaka et al. | |
| 2023/0228878 A1 | 7/2023 | Asghari et al. | |
| 2023/0258861 A1 | 8/2023 | Vercruysse et al. | |
| 2023/0266466 A1* | 8/2023 | Ummethala | G01S 7/4814 356/4.01 |
| 2023/0288566 A1 | 9/2023 | Nadkarni et al. | |
| 2023/0296732 A1 | 9/2023 | Xiao | |
| 2025/0085401 A1 | 3/2025 | Zhou et al. | |
| 2025/0094380 A1 | 3/2025 | Mazed | |

FOREIGN PATENT DOCUMENTS

| | | | |
|---|---|---|---|
| CN | 103874945 A | 6/2014 | |
| CN | 104459881 A | 3/2015 | |
| CN | 204479750 U | 7/2015 | |
| CN | 105589074 A | 5/2016 | |
| CN | 105680320 A | 6/2016 | |
| CN | 105917257 A | 8/2016 | |
| CN | 106154248 A | 11/2016 | |
| CN | 106410607 A | 2/2017 | |
| CN | 106773028 A | 5/2017 | |
| CN | 106842232 A | 6/2017 | |
| CN | 106959439 A | 7/2017 | |
| CN | 107144847 A | 9/2017 | |
| CN | 107305184 A | 10/2017 | |
| CN | 107367734 A | 11/2017 | |
| CN | 107976666 A | 5/2018 | |
| CN | 108139465 A | 6/2018 | |
| CN | 108291970 A | 7/2018 | |
| CN | 108603758 A | 9/2018 | |
| CN | 109254296 A | 1/2019 | |
| CN | 109471129 A | 3/2019 | |
| CN | 109642952 A | 4/2019 | |
| CN | 110036276 A | 7/2019 | |
| CN | 107192355 B | 8/2019 | |
| CN | 110161516 A | 8/2019 | |
| CN | 110187350 A | 8/2019 | |
| CN | 110412685 A | 11/2019 | |
| CN | 111338025 A | 6/2020 | |
| CN | 112241014 A | 1/2021 | |
| CN | 114419152 A | 4/2022 | |
| DE | 10 2015 222061 A1 | 5/2017 | |
| DE | 10 2017 200795 A1 | 7/2018 | |
| DE | 10 2017 106 226 A1 | 9/2018 | |
| DE | 102019124598 A1 | 3/2020 | |
| EP | 0 523 921 A1 | 1/1993 | |
| EP | 2796890 A1 | 10/2014 | |
| EP | 2955542 B1 | 4/2017 | |
| EP | 3276371 A1 | 1/2018 | |
| EP | 3339924 A1 | 6/2018 | |
| EP | 3259615 B1 | 11/2019 | |
| EP | 3719537 A1 | 10/2020 | |
| EP | 3 584 893 B1 | 6/2021 | |
| EP | 3889644 A1 | 10/2021 | |
| GB | 1 585 053 A | 2/1981 | |
| GB | 2173664 A | 10/1986 | |
| GB | 2586499 A | 2/2021 | |
| JP | S53-123004 A | 10/1978 | |
| JP | H05-158096 A | 6/1993 | |
| JP | H09-33872 A | 2/1997 | |
| JP | H1010227 A | 1/1998 | |
| JP | 2003224321 A | 8/2003 | |
| JP | 2004-151022 A | 5/2004 | |
| JP | 2007184511 A | 7/2007 | |
| JP | 2008160130 A | 7/2008 | |
| JP | 2008292370 A | 12/2008 | |
| JP | 2009-115696 A | 5/2009 | |
| JP | 2010151806 A | 7/2010 | |
| JP | 2010271624 A | 12/2010 | |
| JP | 2012146787 A | 8/2012 | |
| JP | 2013165407 A | 8/2013 | |
| JP | 2014202716 A | 10/2014 | |
| JP | 2015-018640 A | 1/2015 | |
| JP | 2015092184 A | 5/2015 | |
| JP | 2015-517094 A | 6/2015 | |
| JP | 2015172540 A | 10/2015 | |
| JP | 2015180735 A | 10/2015 | |
| JP | 2015230259 A | 12/2015 | |
| JP | 2016111087 A | 6/2016 | |
| JP | 2016-525209 A | 8/2016 | |
| JP | 5975203 B2 | 8/2016 | |
| JP | 2017502315 A | 1/2017 | |
| JP | 2017097340 A | 6/2017 | |
| JP | 2017106897 A | 6/2017 | |
| JP | 2017524918 A | 8/2017 | |
| JP | 2017161484 A | 9/2017 | |
| JP | 2017-198514 A | 11/2017 | |
| JP | 2017-211348 A | 11/2017 | |
| JP | 2018511054 A | 4/2018 | |
| JP | 2018-512600 A | 5/2018 | |
| JP | 2018520346 A | 7/2018 | |
| JP | 2018529955 A | 10/2018 | |
| JP | 2018188284 A | 11/2018 | |
| JP | 2018200273 A | 12/2018 | |
| JP | 2019502925 A | 1/2019 | |
| JP | 2019095218 A | 6/2019 | |
| JP | 2019525195 A | 9/2019 | |
| JP | 2019-203977 A | 11/2019 | |
| JP | 2019-537012 A | 12/2019 | |
| JP | 2020-012641 A | 1/2020 | |
| JP | 2020-16639 A | 1/2020 | |
| JP | 2020-34546 A | 3/2020 | |
| JP | 2002090457 A | 3/2020 | |
| JP | 2020085723 A | 6/2020 | |
| JP | 2021004800 A | 1/2021 | |
| JP | 2021032848 A | 3/2021 | |
| JP | 7397009 B2 | 12/2023 | |
| KR | 20060086182 A | 7/2006 | |
| KR | 10-2015-0045735 A | 4/2015 | |
| KR | 20180013598 A | 2/2018 | |
| KR | 101 931 022 B1 | 12/2018 | |
| WO | 97/11396 A1 | 3/1997 | |
| WO | 2010123182 A1 | 10/2010 | |
| WO | 2010127151 A1 | 11/2010 | |
| WO | 2012123668 A1 | 9/2012 | |
| WO | 2012153309 A2 | 11/2012 | |
| WO | 2013/049579 A1 | 4/2013 | |
| WO | 2014/203654 A1 | 12/2014 | |

(56) References Cited

FOREIGN PATENT DOCUMENTS

| | | | |
|---|---|---|---|
| WO | 2014/206630 A1 | 12/2014 |
| WO | 2015/044370 A1 | 4/2015 |
| WO | 2015/058209 A1 | 4/2015 |
| WO | 2015/098027 A1 | 7/2015 |
| WO | 2015/200800 A1 | 12/2015 |
| WO | 2016/024332 A1 | 2/2016 |
| WO | 2016/097409 A2 | 6/2016 |
| WO | 2017/023107 A1 | 2/2017 |
| WO | 2017/083597 A1 | 5/2017 |
| WO | 2017/095817 A1 | 6/2017 |
| WO | 2017/102156 A1 | 6/2017 |
| WO | 2017/187510 A1 | 11/2017 |
| WO | 2017/216581 A1 | 12/2017 |
| WO | 2018/003852 A1 | 1/2018 |
| WO | 2018/036946 A1 | 3/2018 |
| WO | 2018/060318 A1 | 4/2018 |
| WO | 2018/116412 A1 | 6/2018 |
| WO | 2018/160240 A2 | 9/2018 |
| WO | 2018/230474 A1 | 12/2018 |
| WO | 2019/010320 A1 | 1/2019 |
| WO | 2019/018894 A1 | 1/2019 |
| WO | 2019/121069 A1 | 6/2019 |
| WO | 2019/130472 A1 | 7/2019 |
| WO | 2019/149815 A1 | 8/2019 |
| WO | 2019/196135 A1 | 10/2019 |
| WO | 2019/217761 A1 | 11/2019 |
| WO | 2019/217857 A1 | 11/2019 |
| WO | 2019/236430 A1 | 12/2019 |
| WO | 2019/236464 A1 | 12/2019 |
| WO | 2020/005537 A1 | 1/2020 |
| WO | 2020/033161 A1 | 2/2020 |
| WO | 2020/046513 A1 | 3/2020 |
| WO | 2020/076566 A1 | 4/2020 |
| WO | 2020/110779 A1 | 6/2020 |
| WO | 2020/129284 A1 | 6/2020 |
| WO | 2020/167515 A1 | 8/2020 |
| WO | 2020/205450 A1 | 10/2020 |
| WO | 2020/0234797 A1 | 11/2020 |
| WO | 2020/251633 A1 | 12/2020 |
| WO | 2021/024038 A1 | 2/2021 |
| WO | 2021/252894 A1 | 12/2021 |
| WO | 2022/013422 A1 | 1/2022 |
| WO | 2022/233503 A1 | 11/2022 |
| WO | 2023/006470 A1 | 2/2023 |
| WO | 2023/118295 A1 | 6/2023 |

OTHER PUBLICATIONS

Anderson et al., "LADAR: Frequency-Modulated Continuous Wave Laser Detection and Ranging", Photogrammetric Engineering & Remote Sensing, vol. 83, No. 11, Nov. 2017.

Baghmisheh, B. B., "Chip-scale Lidar", Jan. 19, 2017, Electrical Engineering and Computer Sciences University of California, Berkeley.

Behroozpour et al., "Electronic-Photonic Integrated Circulator 3D Microimaging", IEEE Journal of Solid-State Circuits, Jan. 2017, vol. 52, No. 1, pp. 161-172.

Behroozpour, B. et al., "Lidar System Architectures and Circuits," IEEE Communications Magazine, Oct. 2017, pp. 135-142.

Carter et al., "Lidar 101: An Introduction to Lidar Technology, Data, and Applications", Nov. 2012, NOAA Coastal Services Center, 76 pages.

Chan, M.K, "Atmospheric transmission windows for high energy short pulse lasers", Thesis, Naval Postgraduate School, Dec. 2003.

Conditional Euclidean Clustering, retrieved on Jul. 9, 2022 from https://pcl.readthedocs.io/projects/tutorials/en/latest/cluster_extraction.html#cluster-extraction.

Cooksey, Catherine C. et al., "Reflectance measurements of human skin from the ultraviolet to the shortwave infrared (250 nm to 2500 nm)", May 23, 2013, SPIE Defense, Security, and Sensing Conference Proceedings Apr. 29-May 3, 2013, Baltimore, Maryland, vol. 8734, Active and Passive Signatures, 9 pages.

Day, I.E., et al. "Solid state absorption attenuator in silicon-on-insulator with MHz bandwidth.", Integrated Photonics Research 2002, Vancouver, Canada, Jul. 17-19, 2002 (Optica Publishing Group, 2002), paper IFA5, 3 pages.

Doylend, J. K., "Two-dimensional free-space beam steering with an optical phased array on silicon-on-insulator", Oct. 1, 2011, Optics Express, 19(22), 21595-2160.

Euclidean Cluster Extraction, retrieved on Jul. 9, 2022 from https://pcl.readthedocs.io/projects/tutorials/en/latest/conditional_euclidean_clustering.html.

Gao, S. and Hui, R., "4. Frequency-modulated continuous-wave lidar using I/Q modulator for simplified heterodyne detection", Optics Letter, vol. 37, No. 11, Jun. 1, 2012, pp. 2022-2024.

Gemfire Corporation, "8-Channel Cyclic (Colorless) Arrayed Waveguide Grating (AWG)", (2018). Retrieved from AMS Technologies: http://www.amstechnologies.com/products/optical-technologies/components/fiberoptics/multiplexers/awg-multiplexers/view/8-channel-cyclic-arrayed-waveguide-grating-awg/.

Goodman, J., "Speckle Phenomena in Optics Theory and Applications", Roberts and Company, Sep. 28, 2007, 130(2), pp. 413-414.

Gulati, et al., "A Low-Power Reconfigurable Analog-to-Digital Converter", IEEE Journal of Solid-State Circuits, Dec. 2001, vol. 36, No. 12, pp. 1900-1911.

Guo et al., "Beat-frequency adjustable Er3+-doped DBR fiber laser for ultrasound detection", Optics Express, Jan. 31, 2011, vol. 19, No. 3, pp. 2485-2492.

Haran, T., "Short-wave infrared diffuse reflectance of Textile Materials", Thesis, Georgia State University, 2008.

Heck et al., "Hybrid Silicon Photonic Integrated Circuit Technology", IEEE Journal of Selected Topics in Quantum Electronics, IEEE, USA, vol. 19, No. 4, Jul. 1, 2013, p. 6100117, 17 pages.

Issakov, V. "Radar Systems, Ch. 2. In Microwave Circuits for 24GHz Automotive Radar in Silicon-based Technologies", Jan. 1, 2010, Berlin Heidelberg: Springer-Verlag, pp. 5-18.

Kaasalainen, S., "The multispectral journey of Lidar", Retrieved from GIM International: https://www.gim-international.com/content/article/the-multispectral-journey-of-lidar, Jan. 24, 2019.

Kelly et al., "Discrete mode laser diodes with ultra narrow linewidthe emission" Feb. 2007, Electronics Letters, vol. 43, 2 pgs.

Klumperink, Eric A.M. et al., "N-path filters and Mixer-First Receivers: A review", 2017 IEEE Custom Integrated Circuits Conference (CICC), Austin, TX, USA, Apr. 30, 2017, pp. 1-8.

Komljenovic et al., "Widely-Tunable Ring-Resonator Semiconductor Lasers", Review, Jul. 17, 2017, 21 pages.

Kotthaus, S., et al., "Derivation of an urban materials spectral library through emittance and reflectance spectroscopy", ISPRS Journal of Photogrammetry and Remote Sensing, Aug. 2014, vol. 94, 194-212.

Kumar et al., "Intra-data center interconnects, networking, and architectures", Coherent Detection, Optical Fiber Telecommunications VII, Oct. 25, 2019, Science Direct, pp. 627-672.

Li, L., "Time-of-Flight Camera—An Introduction", 2014, TI Technical White Paper, SLOA190B.

Li et al., "Photon-Counting Chirped Amplitude Modulation Lidar with 1.5-GHz Gated InGaAs/InP APD", IEEE Photonics Technology Letters, Mar. 15, 2015, vol. 27, No. 6, pp. 616-719.

Lu, Z., "Silicon Photonic Switches for Optical Communication Applications", PhD Thesis. University of British Columbia, Sep. 29, 2017, 165 pages.

Nevlacsil et al., "Multi-channel swept source optical coherence tomography concept based on photonic integrated circuits", Optics Express, Oct. 26, 2020, vol. 28, No. 22, pp. 32468-32482.

PDB450C—Switchable Gain Balanced Amp. Photodetector, InGaAs. (n.d.). Retrieved from Thorlabs: https://www.thorlabs.com/thorproduct.cfm?partnumber=PDB450C.

Pfennigbauer, M et al., "Multi-Wavelength Airborne Laser Scanning", ILMF 2011. New Orleans, Feb. 7-9, 2011.

PI Motion/Positioning, 2018, Retrieved from Pi USA: http://www.pi-usa.us/products/PDF_Data/Q-522_Mini_Positioning_Stage_20150203.pdf.

PI USA: Fast Tip/Tilt Platform, 2018, Retrieved from PI USA Active Optics: http://www.pi-usa.us/products/PDF_Data/S335_Fast_Tip-Tilt_Platform.pdf.

(56) References Cited

OTHER PUBLICATIONS

Pierrottet et al., "Linear FMCW Laser Radar for Precision Range and Vector Velocity Measurements", MRS Online Proceeding Library Archive, Jan. 2008, pp. 1-9.

Pilot Photonics, Lyra OCS 1000, Optical comb laser module, Retrieved on Nov. 20, 2019 from Pilot Photonics: http://www.pilotphotonics.com/optical-frequency-comb-source/.

Poulton, C. V. MSC Thesis, "Integrated LIDAR with Optical Phased Arrays in Silicon Photonics", Massachusetts Institute of Technology, Sep. 2016, pp. 95-101.

Poulton, Christopher V. et al., "Coherent Solid-State LIDAR with Silicon Photonic Optical Phased Arrays", pp. 4091-4094, Oct. 15, 2017, Optics Letters, vol. 42, No. 20.

Rablau, "LIDAR—A new (self-driving) vehicle for introducing optics to broader engineering and non-engineering audiences", in Fifteenth Conference on Education and Training in Optics and Photonics 2019, May 21-24, 2019, Quebec City, Quebec, Optica Publishing Group 2019, Paper 11143_138 (14 pages).

Royo et al., "An Overview of LIDAR Imaging Systems for Autonomous Vehicles", Appl. Sci., Sep. 30, 2019, 9(19):4093, 37 pages. https://doi.org/10.3390/app9194093.

Rusu, Radu Bogdan Dissertation, Semantic 3D Object Maps for Everyday Manipulation in Human Living Environments, retrieved on Jul. 9, 2022 from http://mediatum.ub.tum.de/doc/800632/941254.pdf.

Sandborn, Phillip Alan McGinnis, "FMCW Lidar: Scaling to the Chip-Level and Improving Phase-Noise-Limited Performance", Fall 2017, 18 pages.

Satyan, N. et al., "Precise control of broadband frequency chirps using optoelectronic feedback," Optics Express, Aug. 31, 2009, vol. 17, No. 18, pp. 15991-15999.

Schulmeister, Karl, "White Paper The new edition of the international laser product safety standard", IEC 60825-1, 2014.

Self, "Focusing of spherical Gaussian beams", Applied Optics, Mar. 1, 1983, vol. 22, No. 5, pp. 658-661.

Singh, Jaswant, "Spectral Reflectance of Land Covers", Retrieved from Department of Geology, Aligharh Muslim University: http://www.geol-amu.org/notes/m1r-1-8.htm, Aug. 15, 2016, 11 pages.

Smit, Meint K. C. v., "Phasar-Based WDM-Devices: Principles, Design and Applications", IEEE Journal of Selected Topics in Quantum Electronics, Jan. 1, 1996, 2(2), 236-250.

Soref, Richard A. et al. "Electrooptical Effects in Silicon", IEEE Journal of Quantum Electronics, vol. QE-23, No. 1, Jan. 1987, pp. 123-129.

Stephens et al., "Demonstration of an Interferometric Laser Ranging System for a Follow-On Gravity Mission to Grace", IEEE International Symposium on Geoscience and Remote Sensing, Jul. 31, 2006 to Aug. 4, 2006, pp. 1115-1118.

Sun, J., et al., "Large-scale silicon photonic circuits for optical phased arrays," vol. 20, No. 4, Jul./Aug. 2014. IEEE Journal of Selected Topics in Quantum Electronics.

Hsu et al., "Free-Space Applications of Silicon Photonics: A Review, Micromachines 2022", 13, 990, Jun. 24, 2022 [Retrieved from: <URL: https://mdpi.com/2072-66X/13/7/990>.

Matos, Taina, International Search Report and Written Opinion, PCT/US2023/027184, International Searching Authority, United States Patent and Trademark Office, Oct. 4, 2023.

"The Demultiplexer" accessed from www.electronics-tutorials.ws/combination/comb_3.html with WayBack Machine dated Feb. 9, 2008, 2 pages.

Van Acoleyen et al., "Off-chip beam steering with a one-dimensional optical phased array on silicon-on-insulator", Apr. 2009, Opt. Lett., 34(9) 1477-1479.

Van Acoleyen et al., "Two-Dimensional Dispersive Off-Chip Beam Scanner Fabricated on Silicon-On-Insulator", Jun. 16, 2011, IEEE Photon. Technol. Lett., 23(17), 1270-1272.

Vasilyev, A. et al., "The Optoelectronic Swept-Frequency Laser and Its Applications in Ranging, Three-Dimensional Imaging, and Coherent Beam Combining of Chirped-Seed Amplifiers," CaltechTHESIS, May 20, 2013, 177 pages.

Velodyne, "HDL-64E S2 Datasheet. Retrieved from http://velodynelidar.com/lidar/products/brochure/HDL-64E%20S2%20datasheet_2010_lowres.pdf", 2017.

Wang et al., "Automotive FMCW Radar-enhanced Range Estimation via a Local Resampling Fourier Transform", International Journal of Advanced Robotic Systems, May 15, 2016, pp. 1-8.

Wikipedia, Optical Attenuator, 2022, 3 pages.

Wojtanowski, J. et al., "Comparison of 905 nm and 1550 nm semiconductor laser rangefinders' performance deterioration due to adverse environmental conditions", Opto-Electronics Review, 22(3), 183-190, Jun. 13, 2014.

Wojtkiewicz et al., "Two-dimensional signal processing in FMCW radars", National Conference on Circuit Theory and Electronic Networks, vol. 2, Oct. 1997, pp. 1-6.

Zhu et al., "Dual-Comb Ranging", Engineering, 4, Oct. 16, 2018, pp. 772-778.

* cited by examiner

IMAGING SYSTEM WITH ENHANCED SCAN RATE

FIELD

The invention relates to optical devices. In particular, the invention relates to LIDAR systems.

BACKGROUND

The performance demands placed on optical imaging systems is increasing as these systems support an increasing number of applications. Optical imaging systems generally generate data for a series of sample regions that are each sequentially illuminated by a system output signal. The data for a sample region indicates the radial velocity and/or distance between the imaging system and one or more objects located in the sample region. The imaging system can scan the system output signal to multiple different sample regions. The sample regions can be stitched together to form a field of view for the imaging system. As a result, the combination of data from the different sample regions provides the data for objects within the field of view.

Increasing the rate at which the LIDAR data can be generated for the different sample regions can increase the frequency that the field of view can be scanned and/or can increase the resolution for the field of view. As a result, increasing the LIDAR data generation rate can increase the number of applications to which a LIDAR system can be successfully applied. However, increasing the LIDAR data generation rate often increases the complexity and/or costs of the LIDAR system. As a result, there is a need for improved LIDAR systems.

SUMMARY

A LIDAR system includes a signal director that can direct an outgoing LIDAR signal to any one of multiple different alternate waveguides. Each of the alternate waveguides being associated with a different switch channel in that a light signal that includes light from the outgoing LIDAR signal directed to a particular one of the alternate waveguides can be characterized as carrying the switch channel associated with that alternate waveguide. The LIDAR system is configured to output system output signals that include light from the outgoing LIDAR signals. The system output signals carry different switch channels. The LIDAR system is configured to receive system return signals that each includes light from the system output signals after an object located outside of the system has received and reflected the system output signal. A signal combiner generates different composite signals by combining light from system return signals that carry different switch channels with a reference signal. Electronics calculate LIDAR data from the frequency of one or more of the composite signals. The LIDAR system being configured to continue to generate a composite signal that carries a first one of the switch channels for a substantial period of time after the imaging system has stopped outputting the system output signal that carries the first switch channel.

BRIEF DESCRIPTION OF THE FIGURES

FIG. 5A is a schematic of an example of a suitable optical-to-electrical assembly for use in the signal processor.

FIG. 5B provides a schematic of the relationship between electronics and the optical-to-electrical assembly of FIG. 5A.

FIG. 8A is a topview of the optical switch.

FIG. 8B is a cross section of the optical switch shown in FIG. 8A taken along the line labeled B in FIG. 8A.

DESCRIPTION

An imaging system has a signal director that can direct an outgoing LIDAR signal to any one of multiple different alternate waveguides. Each of the alternate waveguides can be associated with a different switch channel. A light signal that includes light from the outgoing LIDAR signal directed to a particular one of the alternate waveguides can be characterized as carrying the switch channel associated with that alternate waveguide.

The system outputs system output signals that include light from the outgoing LIDAR signals. As a result, the system output signals can carry different switch channels. In some instances, the imaging system is configured such that the direction that the system output signal travels away from the imaging system changes in response to a change in the alternate waveguide that receives the system output signal. As a result, system output signals carrying different switch channels can travel away from the imaging system in different directions.

The imaging system receives system return signals. Each of the system return signals includes light from one of the system output signals after an object located outside of the system has received and reflected the system output signal. As a result, the system return signals carry different switch channels.

The imaging system generates different composite signals by combining light from system output signals that carry different switch channels with a reference signal. Accordingly, different composite signals can carry different switch channels. The imaging system can include electronics that calculate LIDAR data from the frequency of one or more of the composite signals. The LIDAR data indicates the radial velocity and/or distance between the LIDAR system and one or more objects that are located outside of the LIDAR system and that reflected one of the system output signals.

The imaging system has the ability to generate a composite signal that carries a first one of the switch channels for a substantial period of time after the imaging system has stopped outputting the system output signal that carries the first switch channel. As a result, the imaging system can direct the outgoing LIDAR signal to a different one of the alternate waveguides while still being able to generate LIDAR data from the composite signal carrying the first switch channel. Accordingly, the imaging system can output a system output signal that carries a second one of the switch channels while being able to generate LIDAR data from the composite signal carrying the first switch channel. The ability to generate LIDAR data carrying one switch channel while outputting a system output signal carrying a different switch channel reduces the period of time that the imaging system needs to output a system output signal carrying a particular channel. Accordingly, this ability can increase the frequency that a field of view can be scanned and/or can increase the resolution for the field of view.

Figure 1:
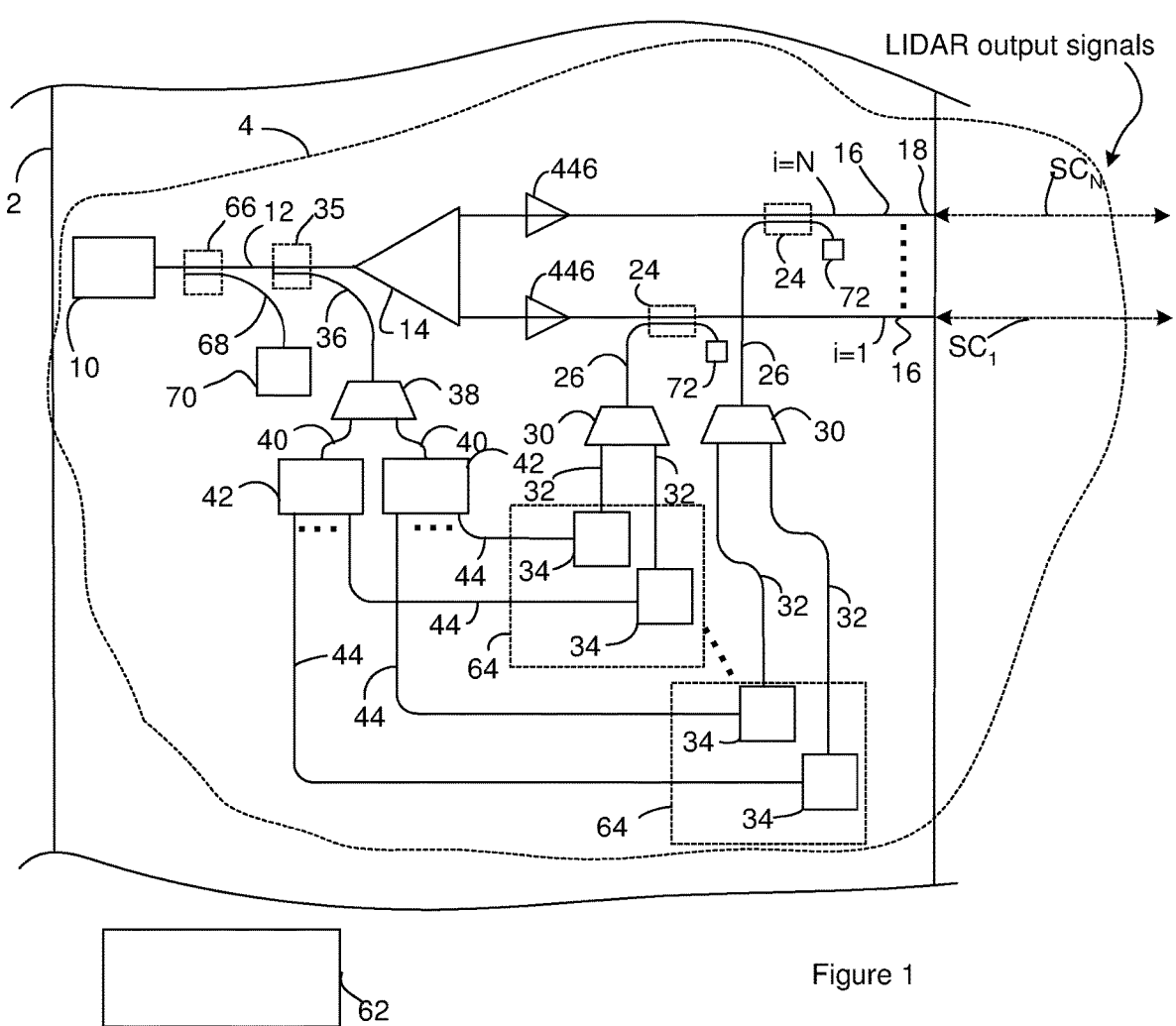
FIG. 1 illustrates an imaging system that includes a chip with a photonic circuit.

FIG. 1 is a schematic of a portion of a LIDAR system that includes a LIDAR chip 2. FIG. 1 includes a topview of a portion of the LIDAR chip 2. The LIDAR chip includes a LIDAR core 4. The LIDAR core 4 includes a photonic integrated circuit. The LIDAR core 4 includes a light source 10 such as a laser that outputs an outgoing LIDAR signal. The outgoing LIDAR signal includes one or more wavelength channels that are each at a different wavelength. When the outgoing LIDAR signal carries more than one wavelength channel, the wavelengths of the wavelength channels can be periodically spaced in that the wavelength increase from one switch channel to the next switch channel is constant or substantially constant. A suitable light source 10 for generating multiple wavelength channels with periodically spaced wavelengths includes, but is not limited to, multiple single wavelength lasers multiplexed into to single optical waveguide, sources such as that described in U.S. patent application Ser. No. 11/998,846, filed on Nov. 30, 2017, grated U.S. Pat. No. 7,542,641, entitled "Multi-Switch channel Optical Device," and incorporated herein in its entirety.

The LIDAR chip includes a utility waveguide 12 that carries the outgoing LIDAR signal to a signal director 14. The signal director 14 can be operated by electronics so as direct light from the outgoing LIDAR signal to one of multiple different alternate waveguides 16. There are N alternate waveguides and each of the alternate waveguides 16 is associated with an alternate waveguide index i where i has a value from 1 to N. Suitable values of N include, but are not limited to, values greater than or equal to 1, 2, or 3 and/or less than or equal to 128, 64, or 32. In one example, N is in the range of 1 to 128.

Each of the alternate waveguides 16 can receive the outgoing LIDAR signal from the signal director 14. When any of the alternate waveguides 16 receives the outgoing LIDAR signal, the alternate waveguides 16 serves an active waveguide and carries the outgoing LIDAR signal to a port 18 through which the outgoing LIDAR signal can exit from the LIDAR chip and serve as a LIDAR output signal. Accordingly, the outgoing LIDAR signal is output from the active waveguide. Suitable ports include, but are not limited to, a facet of an alternate waveguide 16.

Light signals that result from the outgoing LIDAR signal being directed to the alternate waveguide 16 with alternate waveguide index i can be considered light signals carrying switch channel ($C_i$). Accordingly, each of the LIDAR output signals is associated with a different one of the alternate waveguide indices switch channel index i=1 through N. For instance, the path of the LIDAR output signal that carries the switch channel with alternate waveguide index N is labeled $SC_N$ in FIG. 1. For the purposes of illustration, the LIDAR system is shown as generating two LIDAR output signals (N=2) labeled $SC_1$ through $SC_N$. Each of the different LIDAR output signals can carry a different switch channel, however, each of the different switch channels can carry the same selections of wavelength(s) or substantially the same selections of wavelength(s).

Light from the LIDAR output signals travels away from the LIDAR system in a system output signal. In some instances, the portion of the LIDAR output signal that exits from the LIDAR chip can also be considered a system output signal. As an example, when the exit of the LIDAR output signal from the LIDAR chip is also an exit of the LIDAR output signal from the LIDAR system, the LIDAR output signal can also be considered a system output signal.

A system output signal can travel through free space in the atmosphere, environment, and or space in which the LIDAR system is positioned. The system output signal may be reflected by one or more objects in the path of the system output signal. When the system output signal is reflected, at least a portion of the reflected light travels back toward the LIDAR chip as a system return signal.

Light from the system return signal can be carried in a LIDAR input signal that is received by the LIDAR chip. In some instances, a portion of the system return signal can serve as a LIDAR input signal.

A LIDAR input signal returns to the LIDAR chip such that a LIDAR input signal carrying switch channel $SC_i$ enters the alternate waveguide 16 that is associated with the same alternate waveguide index i. As a result, LIDAR input signals carrying different switch channels are directed to different alternate waveguides. The portion of the LIDAR input signal that enters an alternate waveguide 16 serves as an incoming LIDAR signal. As a result, the alternate waveguide that receives the incoming LIDAR signal can guides an outgoing LIDAR signal while also guiding the incoming LIDAR signal in the opposite direction. The alternate waveguide 16 that receives the incoming LIDAR signal carries a portion of the incoming LIDAR signal to the signal director 14. The signal director 14 outputs the received portion of the incoming LIDAR signal on the utility waveguide 12.

The alternate waveguide 16 carries the incoming LIDAR signal to a splitter 24 that moves a portion of the incoming LIDAR signal from alternate waveguide 16 onto a preliminary comparative waveguide 26 as a preliminary comparative signal. Suitable splitters 24 include, but are not limited to, optical couplers, y-junctions, and MMIs. In some instances, the splitter 24 is configured such that the power of the incoming LIDAR signal is divided evenly or substantially evenly between the utility waveguide 12 and the comparative waveguide 26.

The preliminary comparative waveguide 26 carries the preliminary comparative signal to a comparative demultiplexer 30. When the comparative light signal includes multiple wavelength channels, the comparative demultiplexer 30 divides the comparative incoming LIDAR signal into different comparative signals that each carries a different one of the wavelength channels. The comparative demultiplexer 30 outputs the comparative signals on different comparative waveguides 32. The comparative waveguides 32 each carry one of the comparative signals to different signal processors 34. Accordingly, the signal processors 34 that receive a comparative signal from the same comparative demultiplexer 30, each receives a comparative signal carrying a different one of the wavelength channels.

The LIDAR chip includes a splitter 35 configured to move a portion of the outgoing LIDAR signal from utility waveguide 12 onto a reference signal waveguide 36. The portion of the outgoing LIDAR signal received by the reference signal waveguide 36 serves as a reference light signal. The reference signal waveguide 36 carries the reference light signal to a reference demultiplexer 38. When the reference light signal includes multiple wavelength channels, the reference demultiplexer 38 divides the reference light signal into different preliminary reference signals that each carries a different one of the wavelength channels. The reference demultiplexer 38 outputs the preliminary reference signals on different reference waveguides 40. Suitable splitters 24 include, but are not limited to, wavelength independent signal splitters such as optical couplers, y-junctions, MMIs, evanescent optical couplers, and star couplers. Suitable reference demultiplexers 38 include, but are not limited to, optical demultiplexers such as Arrayed Waveguide Gratings (AWGs), and echelle gratings.

The reference waveguides 40 each carry one of the preliminary reference signals to a different splitter 42. Each of the splitters 42 divides the preliminary reference signal into multiple different reference signals that are each output on a different reference waveguide 44. The reference waveguides 44 each carry one of the reference signals to a different one of the signal processors 34. Suitable splitters 42 include, but are not limited to, wavelength independent signal combiners such as an optical couplers, y-junctions, MMIs, cascaded evanescent optical couplers, cascaded y-junctions, and start couplers.

The comparative waveguides 32 and the reference waveguides 44 are configured such that a comparative signal and the corresponding reference signal are received at the same signal processor 34. For instance, the comparative waveguides 32 and the reference waveguides 40 are configured such that the comparative signal and the corresponding reference signal carrying the same wavelength channel are received at the same signal processor 34. Accordingly, the different signal processors 34 each receives the comparative signal and the reference signal carrying the same wavelength channel.

Additionally, the comparative waveguides 32 and the reference waveguides 44 are configured such that each of the signal processors 34 receives a comparative signal and a reference signal carrying the same switch channel. As a result, each of the signal processors 34 receives a comparative signal and a reference signal carrying the same switch channel and also the same wavelength channel. In some instances, the comparative waveguides 32 and the reference waveguides 44 are configured such that each of the signal processors 34 receives a comparative signal and a reference signal with a unique combination of the switch channel and wavelength channel. The signal processors 34 can be arranged in different switch channel groups 64. The signal processors 34 in the same switch channel group 64 each receive a comparative signal and a reference signal carrying the same switch channel. For instance, the signal processors 34 in the same switch channel group 64 can receive comparative signal and a reference signal carrying different wavelength channels but the same switch channel $C_i$.

As will be described in more detail below, the signal processors 34 each combines a comparative signal with the corresponding reference signal to form a composite optical signal that carries LIDAR data for a sample region on the field of view. Accordingly, the composite optical signal can be processed so as to extract LIDAR data for a sample region.

The LIDAR chip can include a control branch for controlling operation of the light source 10. The control branch includes a directional coupler 66 that moves a portion of the outgoing LIDAR signal from the utility waveguide 12 onto a control waveguide 68. The coupled portion of the outgoing LIDAR signal serves as a tapped signal. Although FIG. 1 illustrates a directional coupler 66 moving the portion of the outgoing LIDAR signal onto the control waveguide 68, other signal-tapping components can be used to move a portion of the outgoing LIDAR signal from the utility waveguide 12 onto the control waveguide 68. Examples of suitable signal tapping components include, but are not limited to, y-junctions, and MMIs.

The control waveguide 68 carries the tapped signal to control components 70. The control components can be in electrical communication with electronics 62. Although FIG. 1 illustrates the electronics as a component that is separate from the signal processor(s) 34, a portion of the electronics can be included in each of the signal processor(s) 34. During operation, the electronics 62 can adjust the frequency of the outgoing LIDAR signal in response to output from the control components. An example of a suitable construction of control components is provided in U.S. patent application Ser. No. 15/977,957, filed on 11 May 2018, entitled "Optical Sensor Chip," and incorporated herein in its entirety.

When the splitters 24 is an optical coupler such as a 2×2 coupler, the splitter can move a portion of the outgoing LIDAR signal onto a preliminary comparative waveguide 26. The preliminary comparative waveguide 26 can optionally end at a beam dump 72 that receives the coupled portion of the outgoing LIDAR signal. A suitable beam dump 72 can be configured to scatter the coupled portion of the outgoing LIDAR signal without reflecting a substantial amount of the light from the coupled portion of the outgoing LIDAR signal back into the preliminary comparative waveguide 26.

Figure 2:
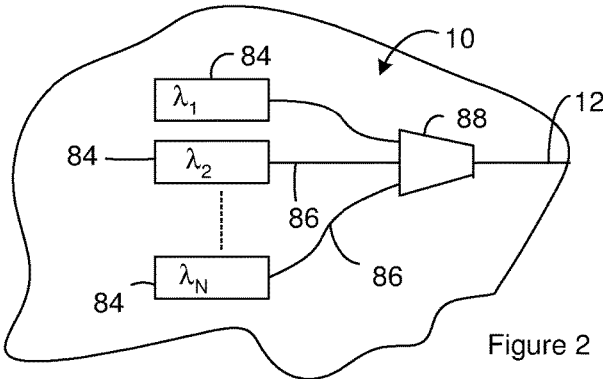
FIG. 2 illustrates a light source that includes multiple laser sources.

FIG. 2 illustrates an example of a light source 10 that includes multiple laser sources 84. In some instances, each of the laser sources 84 outputs one or more of the channels on a source waveguide 86. The source waveguides 86 carry the channels to a laser multiplexer 88 that combines the channels so as to form a light signal that is received on a channel waveguide or the utility waveguide 12. Suitable laser multiplexers 88 include, but are not limited to, Arrayed Waveguide Grating (AWG) multiplexers, echelle grating multiplexers, and star couplers. The electronics can operate the laser sources 84 so the laser sources 84 concurrently output each of the channels. The electronics can operate the laser sources 84 so the laser sources 84 concurrently output each of the channels.

In some instances, each of the laser sources 84 outputs one of the wavelength channels on a source waveguide 86. As a result, each laser sources 84 can be the source of a different one of the wavelength channels in an outgoing LIDAR signal and accordingly in a system output signal.

The electronics can operate the laser sources 84 independently. For instance, the electronics can operate the laser sources 84 so as to provide the LIDAR output signals with a particular frequency versus time waveform. Since the electronics can operate the laser sources 84 independently and each laser sources 84 can be the source of a different one of the wavelength channels, the electronics can operate the laser sources 84 so different wavelength channels in an outgoing LIDAR signal, and accordingly in a system output signal, have different frequency versus time waveforms.

Suitable laser sources 84 for use with a light source 10 constructed according to FIG. 2 include, but are not limited to, external cavity lasers, distributed feedback lasers (DFBs), and Fabry-Perot (FP) lasers. External cavities lasers are advantageous in this embodiment because of their generally narrower linewidths, which can reduce noise in the detected signal.

Figure 3:
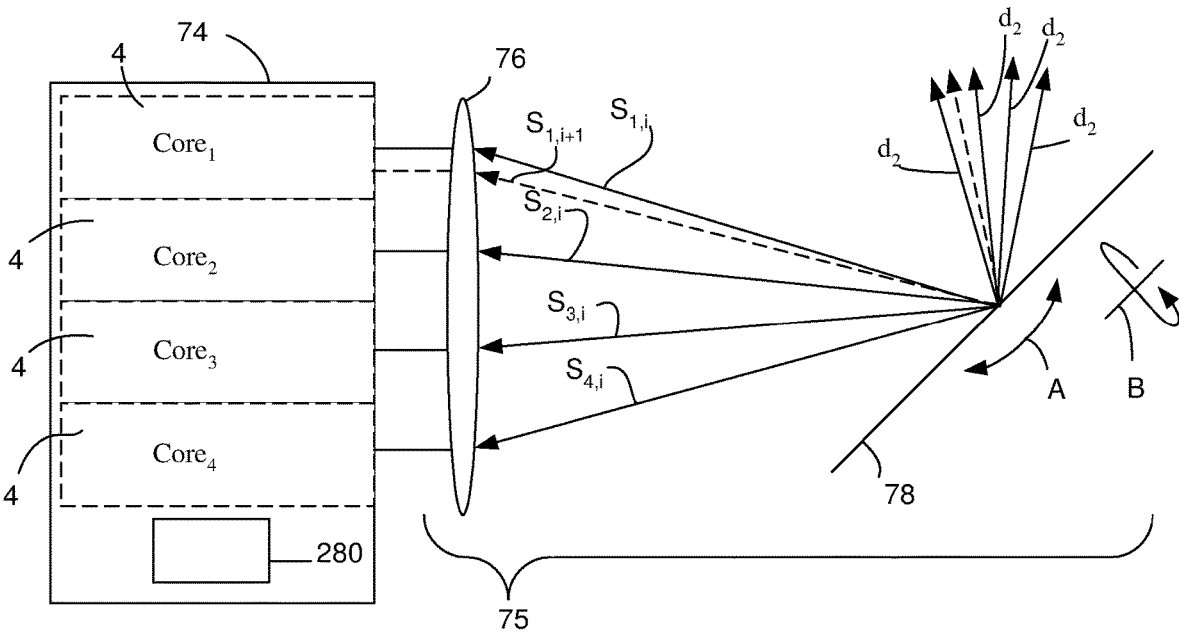
FIG. 3 is a schematic of an imaging system that includes multiple different cores on a chip.

A LIDAR system can include a LIDAR chip with one or more cores 4. As an example, FIG. 3 illustrates a LIDAR chip that includes multiple different cores. The cores are each labeled core$_k$ where k represents a core index k. Each of the LIDAR cores can be constructed as disclosed in the context of FIG. 1 or can have an alternate construction. Each of the LIDAR cores outputs a different LIDAR output signal. The LIDAR output signal output from the core labeled core$_k$ can be represented by S$_{k,i}$ where i represents the switch channel index. As a result, S$_{k,i}$ is function of the alternate waveguide index i and the core index k. As an example, the LIDAR output signal represented by S$_{k,i}$ is output from core$_k$ and was received by alternate waveguide index i. Accordingly, the LIDAR output signal represented by S$_{k,i}$ is output from core$_k$ and carries switch channel SC$_i$.

The LIDAR system can include an optical component assembly 75 that receives the LIDAR output signals from different cores and outputs system output signals that each includes, consists of, or consists essentially of light from a different one of the LIDAR output signals. The optical component assembly 75 can be operated by electronics 280 so as to steer the system output signals to different sample regions in the LIDAR system's field of view.

FIG. 3 illustrates an optical component assembly 75 that includes signal director 76 that receives each of the LIDAR output signal. The signal director 76 changes the direction that at least a portion of the LIDAR output signals are traveling and outputs each of the LIDAR output signal as a re-directed LIDAR output signal. Suitable signal directors 76 include, but are not limited to, convex lenses and concave mirrors. The optical component assembly 75 includes one or more beam directors 78 that receive the re-directed LIDAR output signals output from the signal director 76 as system output signals. The direction that the system output signals travel away from the LIDAR system is labeled d$_2$ in FIG. 3. The electronics can operate the one or more beam directors 78 so as to steer the each of the system output signal to different sample regions in a field of view. As is evident from the arrows labeled A and B in FIG. 3, the one or more beam directors 78 can be configured such that the electronics can steer the system output signals in one dimension or in two dimensions. As a result, the one or more beam directors 78 can function as a beam-steering mechanism that is operated by the electronics so as to steer the system output signals within the field of view of the LIDAR system. Suitable beam directors 78 include, but are not limited to, movable mirrors, MEMS mirrors, optical phased arrays (OPAs), optical gratings, and actuated optical gratings. In some instances, the signal director 76 and/or the one or more beam directors 78 are configured to operate on the system output signals such that the system output signals are collimated or substantially collimated as they travel away from the LIDAR system. Additionally or alternately, the LIDAR system can include one or more collimating optical components (not illustrated) that operate on the LIDAR output signals, re-directed LIDAR output signals, and/or the system output signals such that the system output signals are collimated or substantially collimated as they travel away from the LIDAR system.

The system output signals can be reflected by an object located outside of the LIDAR system. All or a portion of the reflected light from a system output signal can return to the LIDAR system as a system return signal. Each of the system return signals is received at the one or more beam directors 78. The one or more beam directors 78 output at least a portion of each of the system return signals as a returned signal. The returned signals are each received at the signal director 76. The signal director 76 outputs at least a portion of each one of the retuned signals as a LIDAR input signal. Each of the different LIDAR input signals is received by a different one of the cores 4. Each of the LIDAR input signals includes or consists of light from the LIDAR output signal that was output from the core that receives the LIDAR input signal. Additionally, the LIDAR input signal received at an alternate waveguide includes or consists of the light from the LIDAR output signal that was output from the same alternate waveguide.

The one or more signal directors 76 can change the direction that a LIDAR output signal travels away from the one or more signal directors 76 such that the direction of a LIDAR output signal is different from the resulting re-directed LIDAR output signal. In some instances, the one or more signal directors 76 are selected such that all or a portion of the re-directed LIDAR output signal travel away from the one or more signal directors 76 in non-parallel directions. As an example, in FIG. 3, the one or more signal directors 76 is a lens and each of the different LIDAR output signals is incident on the lens at a different angle of incidence. As a result, the re-directed LIDAR output signals each travels away from the signal director 76 in a different direction. Further, the re-directed LIDAR output signals travel away from the signal director 76 in non-parallel directions. As is evident from FIG. 3, the different directions of the system output signals can result in the system output signals traveling away from the LIDAR system in different directions. In some instances, the system output signals travel away from the LIDAR system in non-parallel directions.

Operating the signal director 14 on a core can change where the LIDAR output signal is received by the one or more signal directors 76 and can accordingly change the direction that the system output signal that originates from that core travels away from the LIDAR system. As an example, the dashed line in FIG. 3 illustrates the result of operating the signal director 14 on core$_1$ such that the core outputs the LIDAR output signal represented by S$_{k,i+1}$ rather than the LIDAR output signal represented by S$_{k,i}$. As is evident from FIG. 3, this operation of the signal director 14 changes the direction that the system output signal output from core$_1$ travels away from the LIDAR system. As a result, the electronics can operate the signal directors 14 on different cores so as to steer the system output signals within the LIDAR system's field of view. Accordingly, the electronics can operate the signal directors 14 on different cores and/or the one or more beam directors 78 so as to steer the system output signals within the LIDAR system's field of view. A suitable method of operating the signal directors 14 on different cores and/or the one or more beam directors 78 so as to steer the system output signals to different sample regions within the LIDAR system's field of view is disclosed in U.S. patent application Ser. No. 17/580,623, filed on Jan. 20, 2022, entitled "Imaging System Having Multiple Cores," and incorporated herein in its entirety.

The optical component assembly 75 can have configurations other than the configuration shown in FIG. 3. For instance, the one or more beam directors 78 can be positioned between the signal director 76 and the LIDAR chip. Additionally, the optical component assembly 75 can include optical components that are not illustrated. For instance, the optical component assembly 75 can include one or more lenses configured to increase collimation of the LIDAR output signals and/or other signals derived from the LIDAR output signals and/or that include light from the LIDAR output signals.

The wavelength of the LIDAR output signal output from different cores can be same or different. As a result, the light source on different cores can be configured to output an outgoing light signal that each has a selection of wavelength that is different, the same or substantially the same. Accordingly, the selection of wavelengths in different system output signals can be different, the same or substantially the same.

All or a portion of the electronics 62 associated with different cores can optionally be consolidated in the electronics 280 illustrated in FIG. 3. The consolidated electronics 280 can be positioned on the LIDAR chip or can be external to the LIDAR chip. The consolidated electronics 280 can collect or generate the LIDAR data results from different cores, and/or can coordinate the LIDAR data results from different cores so as to assemble LIDAR data results for the LIDAR system's field of view.

Although FIG. 3 illustrates four cores on the LIDAR chip, the LIDAR chip can include one, two, or more than two cores. Suitable numbers of cores on the LIDAR chip, include, but are not limited to, numbers greater than or equal to 1, 2, 4, or 6 and/or less than 32, 64, or 128.

Figure 4A:
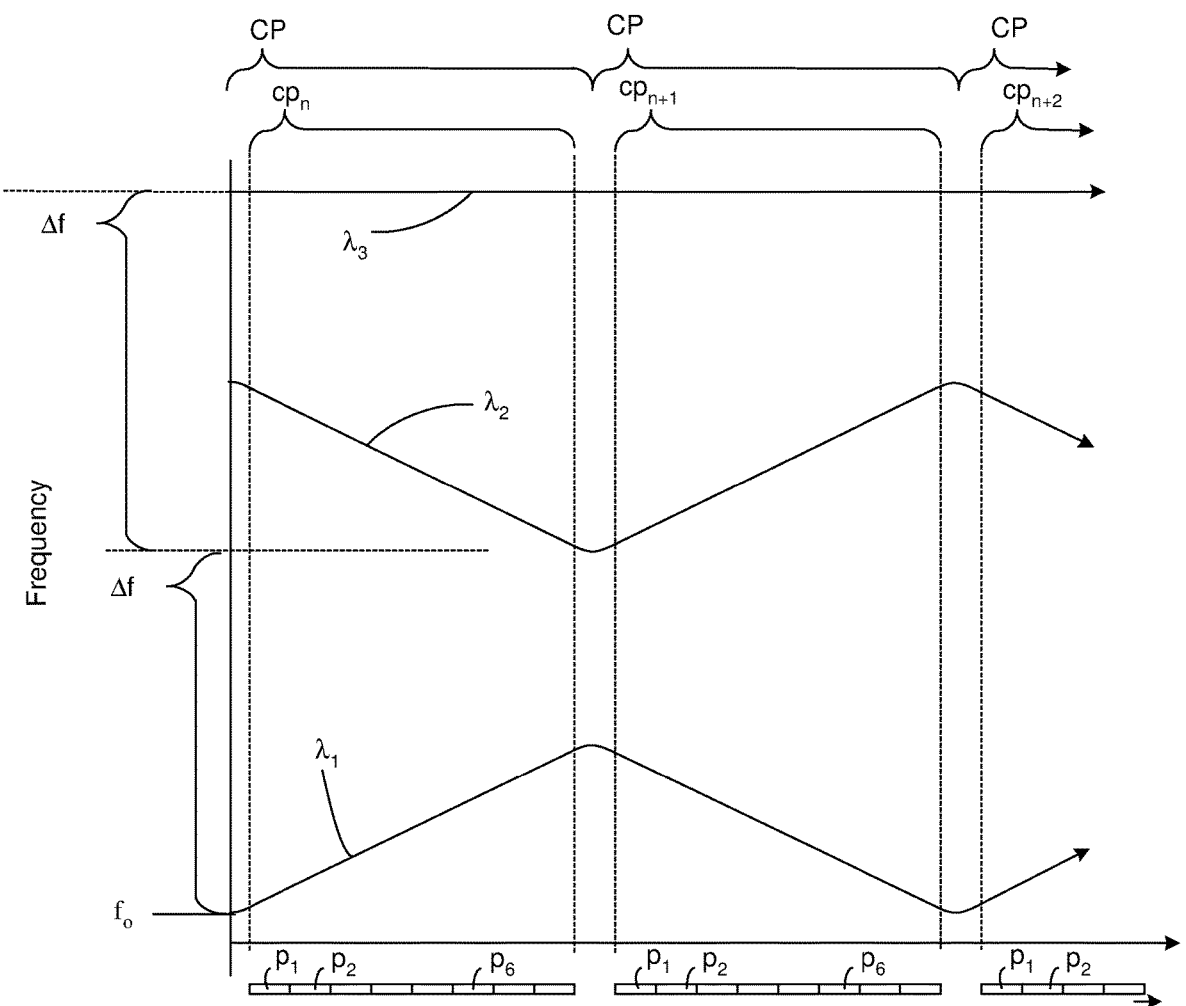
FIG. 4A is a frequency versus time schedule for tuning the wavelength channels in a system output signal.
Figure 4B:
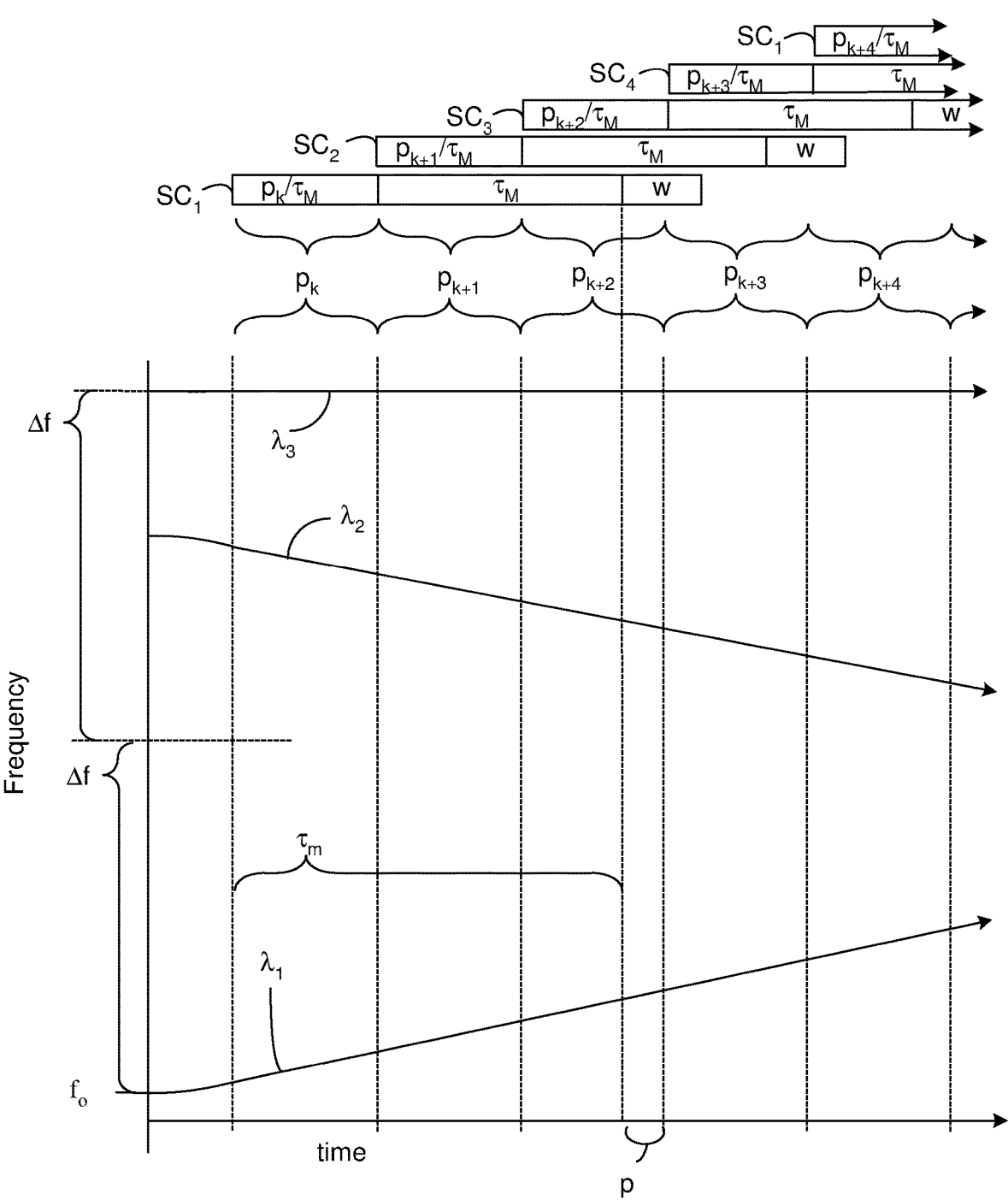
FIG. 4B is a magnified version of the frequency versus time schedule shown in FIG. 4A showing only a portion of one of the chirp cycles shown in FIG. 4A.

During operation of the LIDAR system, the electronics chirp the frequency of one or more of the wavelength channels in the system output signal. FIG. 4A and FIG. 4B provide an example of a frequency versus time schedule for tuning the wavelength channels in the system output signal. The system output signal is illustrated as carrying channels labeled $\lambda_j$ where j is a wavelength channel index with a value from 1 to M where M=3 in this example. In some instances, the base frequencies of the wavelength channels are separated by $\Delta f$. The frequencies are tuned such that there is no overlap in the frequencies of the different wavelength channels. The system output signals $\lambda_1$ and $\lambda_2$ each has a chirped frequency in that the frequency changes with time. The chirp of the system output signals $\lambda_1$ and $\lambda_2$ is done for a series of chirp cycles that each has a duration labeled CP. FIG. 4B is a magnified version of the frequency versus time schedule shown in FIG. 4A showing only a portion of one of the chirp cycles shown in FIG. 4A.

At least two of the wavelength channels have a frequency that is chirped at a different rate and/or in a different direction. For instance, the chirp of the system output signals carrying wavelength channels $\lambda_1$ and $\lambda_2$ during a chirp cycle can be an upward chirp where the frequency increases or a downward chirp where the frequency decreases. The chirp of a system output signal carrying wavelength channels $\lambda_1$ or $\lambda_2$ during a chirp cycle has a linear chirp section between non-linear chirp sections. The non-linear chirp section may be a product of changing chirp direction at the interface between chirp cycles. The duration of the linear chirp sections is labeled $cp_n$ in FIG. 4A where n is a cycle index. In some instance, the duration of the linear chirp section is greater than 5 μs, 10 μs, or 100 μs and/or less than 200 μs, 500 μs, or 1000 μs. In some instance, the duration of the linear chirp section is more than 5, 10, or 100 and/or less than 200, 500, or 1000 times a total duration of the one or more non-linear chirp sections included in the chirp cycles.

During the same chirp cycle, the frequency change for output signals carrying wavelength channels $\lambda_1$ and $\lambda_2$ is in the opposite direction but at the same rate. As a result, a sample region is concurrently illuminated by at least one wavelength channel with an increasing frequency and at least one wavelength channel with a decreasing frequency where the rate of the frequency change is the same.

The system output signal carrying wavelength channel labeled $\lambda_3$ is optional. Although the system output signal labeled $\lambda_3$ is shown with an unchirped frequency, the system output signal carrying $\lambda_3$ can have a chirped or unchirped frequency. When the system output signal carrying $\lambda_3$ has a chirped frequency, the rate and/or direction of the frequency chirp can be different from the rate and direction of the frequency chirp of the system output signal $\lambda_1$ and also from the rate and direction of the frequency chirp of the system output signal $\lambda_2$.

The system output signal is output during multiple different output periods. The composite optical signals that are generated in response to output of a system output signal during an output period are used to generate LIDAR data for the output period. The LIDAR data for an output period indicates the radial velocity and/or distance between the LIDAR system and one or more objects that reflected the system output signal that was output during the output period. The different output periods are each labeled $p_k$ in FIG. 4A where k is an output period index with values greater than or equal to 1. Output periods can occur in series. In some instances, there is no delay or substantially no delay between output periods that are adjacent to one another in time in the same chirp cycle.

The output periods can each have the same or substantially the same duration. In some instances, the duration of the output period is greater than 1 μs, 2 μs, or 4 μs and/or less than 5 μs, 10 μs, or 100 μs. Additionally or alternately, the duration of the linear chirp section can be more than 2, 5, or 10 and/or less than 20, 100, or 200 times a duration of each one of at least a portion of the output periods.

As noted above, the system output signal can be steered to different sample regions in the LIDAR systems field of view. The sample regions can each be associated with one of the output periods. For instance, a sample region can be the volume of the field of view that is illuminated by the system output signal output during the output period associated with that sample region and that extends the maximum operational distance from the LIDAR system.

At the expiration of each output period, the electronics can operate the signal director 14 so as to switch the alternate waveguide 16 that receives the light source output signal. As a result, the switch channel carried by the light source output signal changes at the change in output periods. Accordingly, the switch channel carried by the system output signal is different for adjacent output periods. As noted in the context of FIG. 3, switching the alternate waveguide 16 that receives the light source output signal and/or changing the switch channel carried by the system output signal changes the direction that the system output signal travels away from the LIDAR system. As a result, the change in the output period is associated with a change in the sample region that is illuminated by the system output signal. Accordingly, each of the output periods is associated with a different one of the sample regions.

A review of FIG. 1 shows that the signal processors 34 in the same switch channel group 64 continue to receive a comparative signal and a reference signal after the alternate waveguide 16 that receives the light source output signal is changed and/or after the switch channel carried by the system output signal is changed. As a result, the composite signals can be generated by the channel group 64 associated with alternate waveguide index i while a different one of the alternate waveguides is receiving the light source output signal. Accordingly, the same core in the LIDAR system can be concurrently receiving system return signals that carry different switch channels and the signal processors 34 on the core can be concurrently processing the composite signals that carry different switch channels.

The ability of the LIDAR system to concurrently process system return signals that carry different switch channels is illustrated in FIG. 4B. The LIDAR system is typically configured to provide reliable LIDAR data when the object is within an operational distance range from the LIDAR system. The operational distance range can extend from a minimum operational distance to a maximum operational distance. A maximum roundtrip time can be the time required for a system output signal to exit the LIDAR system, travel the maximum operational distance to the object with a surface at the maximum operational distance and to return to the LIDAR system. An example of a possible maximum roundtrip time is labeled $\tau_M$ in FIG. 4B. When an object has a surface positioned at the maximum operational distance, the system return signal that results from that surface will not return to the LIDAR system until the maximum roundtrip time has passed. For instance, when the maximum roundtrip time has a duration between the duration of two and three output periods as shown in FIG. 4B, and an object has a surface positioned at the maximum operational distance during output period $p_k$, the LIDAR system will not generate a composite optical signal from that surface until between the end of the output period $p_{k+2}$ and the start of the output period $p_{k+3}$. Accordingly, the duration of two output periods passes before LIDAR data can be generated for a surface positioned at the maximum operational distance. However, when an object has a surface positioned at a distance that is less than maximum operational distance from the LIDAR system, LIDAR data can be generated earlier. For instance, an object can be positioned close enough to the LIDAR system that composite optical signals from that object occur sufficiently early to generate LIDAR data in the output period labeled $p_k$. In some instances, the duration of the output period can be greater than 0.1, 0.2, or 0.3 of the maximum roundtrip time and less than 0.5, 0.7, or 0.9 of the maximum roundtrip time.

The top of FIG. 4B includes multiple horizontal rectangles that are each associated with a different one of the output periods. Each of the rectangles represents a data period and includes multiple different time zones. The rectangles are divided into multiple segments and each of the segments is labeled with the different times that are passing within the segment. For instance, one of the segments in each data period is labeled $p_k/\tau_M$. This segment indicates where the output period $p_k$ occurs relative to the time scale on the x-axis. The label $\tau_M$ also indicates that the maximum roundtrip time ($\tau_M$) begins at the start of this time segment. Another one of the segments in each data period is labeled $\tau_M$ and indicates the continued tolling of the maximum roundtrip time ($\tau_M$) during this time segment. The maximum roundtrip time ($\tau_M$) terminates during this time segment.

Since there is a delay between the system output signal being transmitted and the resultant system return signal returning to the LIDAR system, the composite signals do not include a contribution from the LIDAR signal until after the system return signal has returned to the LIDAR system. Since the composite signal needs the contribution from the system return signal for there to be a beat frequency, the electronics use the composite signals that occur after the system return signal returns to the LIDAR system to generate the LIDAR data. The composite signal needs to be present for a period of time (measurement period, w) for the electronics to measure the beat frequency of the composite signal. As a result, each of the data periods shown in FIG. 4B includes a segment labeled w.

In FIG. 4B, the measurement periods (w) are located at the end of the data periods to illustrate the total duration of a data period when an object is positioned at the maximum operational distance. However, the actual location of the measurement period (w) in the data period can change in response to the proximity of the object to the LIDAR system. For instance, the closer an object moves toward the LIDAR system, the earlier the measurement period (w) can occur in a data period.

In the example of FIG. 4B, each of the data periods is associated with a switch channel label $SC_1$ through $SC_4$. As a result, the core illustrated in FIG. 4B has N=4 alternate waveguides. Accordingly, the data period associated with the switch channel label $SC_2$ includes an output period $p_{k+1}$ during which the alternate waveguide 16 labeled i=2 in FIG. 1 receives the outgoing LIDAR signal from the signal director 14. However, the outgoing LIDAR signal is not received at the alternate waveguide 16 labeled i=2 after termination of the output period $p_{k+1}$ because the signal director 14 is directing the outgoing LIDAR signal to the alternate waveguide 16 labeled i=3. However, the LIDAR system continues to generate the composite signal that carries a first one of the switch channels for a substantial period of time after the imaging system has stopped outputting the system output signal that carries the first switch channel i=2. For instance, the LIDAR system can continue to generate the composite signal that carries a first one of the switch channels for more than 0.1, 1, 1.3 or 1.5 times the output period after the imaging system has stopped outputting the system output signal carrying the first switch channel. In some instances, the LIDAR system stops generating the composite signal that carries a first one of the switch channels in less than 2, 4 or 6 times the output period after the imaging system has stopped outputting the system output signal carrying the first switch channel. As a result, the system can direct the outgoing LIDAR signal to a different one of the alternate waveguides while still being able to generate LIDAR data from the composite signal carrying a first one of the switch channels. Accordingly, the system can output a system output signal that carries a second one of the switch channels while being able to generate LIDAR data from the beat frequency of composite signal carrying the first switch channel. As shown in FIG. 4B, in some instances, the system can output a system output signal that carries a third one of the switch channels while being able to generate LIDAR data from the beat frequency of a composite signal carrying the first switch channel and also while being able to generate LIDAR data from the beat frequency of a composite signal carrying the second switch channel. Accordingly, the system can output a system output signal that carries a third one of the switch channels while being able to generate LIDAR data from the beat frequency of a composite signal carrying the first switch channel and also while being able to generate LIDAR data from the beat frequency of a composite signal carrying the second switch channel and also while being able to generate LIDAR data from the beat frequency of a composite signal carrying the third switch channel. As a result, in some instances, the system can concurrently generate LIDAR data from the beat frequencies of a two or more different composite signals that each carries a different one of the switch channels. The ability to generate LIDAR data carrying one switch channel while outputting a system output signal carrying a different switch channel reduces the period of time that the imaging system needs to output a system output signal carrying a particular channel.

In FIG. 4B there are two different data periods associated with the switch channel label $SC_1$. The second occurrence occurs as a result of the electronics sequentially directing the outgoing LIDAR signal to the alternate waveguides 16 labeled i=1 through i=N before returning to the alternate waveguide 16 labeled i=1 and repeating the sequence. The data period associated with switch channel label $SC_1$ does not start until after the prior data period associated with the same switch channel (SCS) ends in order to prevent overlapping use of the signal processors in the switch channel group 64 associated with switch channel i. For instance, in FIG. 4B, the data periods labeled $SC_1$ do not overlap.

Figures 5A, 5B:
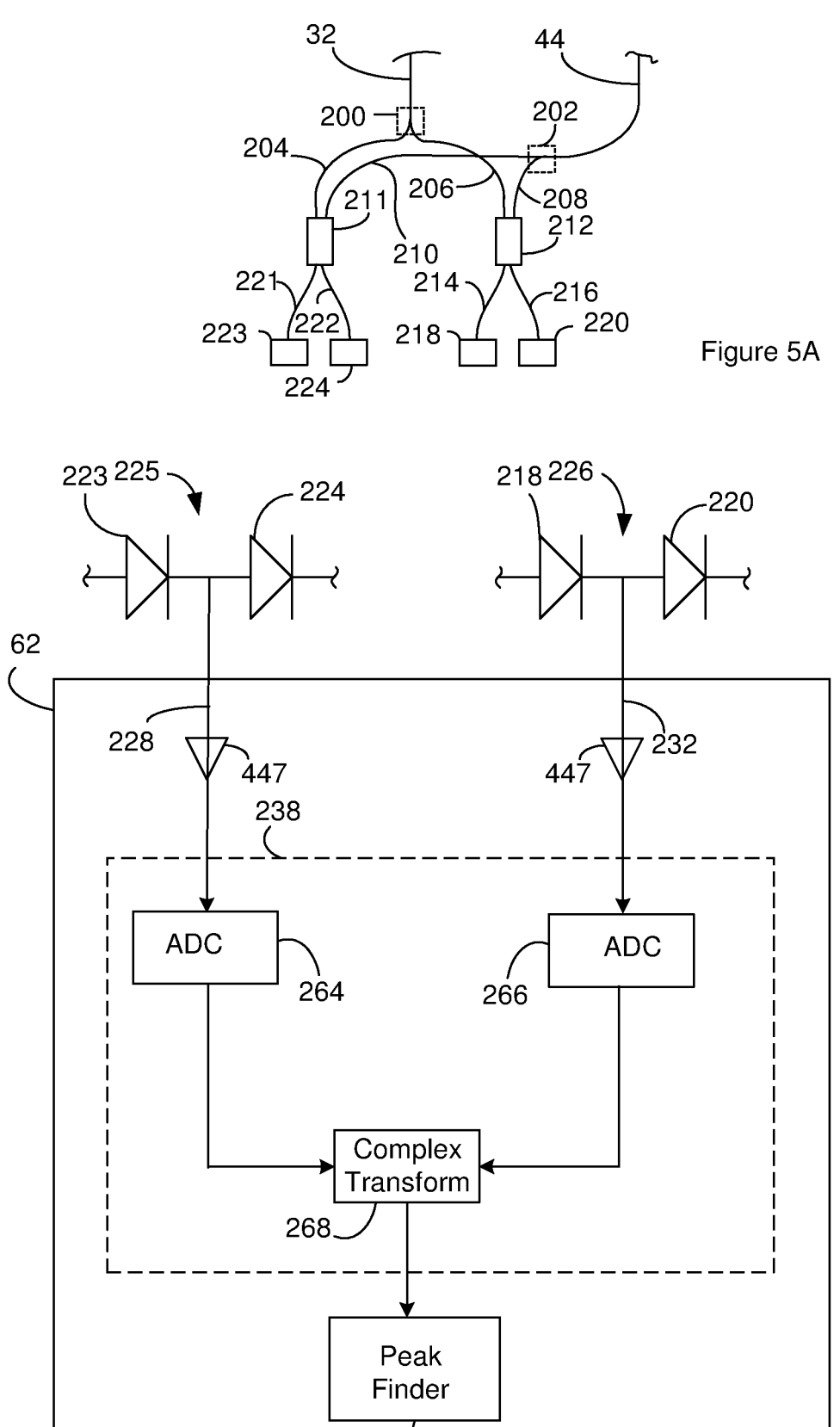
FIG. 5A and FIG. 5B illustrate an example of a signal processor that is suitable for use as the signal processor in a LIDAR system constructed according to FIG. 1.

FIG. 5A through FIG. 5B illustrate an example of suitable signal processors 34 for use as any of signal processors 34 in a LIDAR system constructed according to FIG. 1. The signal processor 34 includes an optical-to-electrical assembly configured to convert the light signals to electrical signals. FIG. 5A is a schematic of an example of a suitable optical-to-electrical assembly that includes a first splitter 200 that divides the comparative signal received from the comparative waveguides 32 onto a first comparative waveguide 204 and a second comparative waveguide 206. The first comparative waveguide 204 carries a first portion of the comparative signal to a light-combining component 211. The second comparative waveguide 206 carries a second portion of the comparative signal to a second light-combining component 212.

The signal processor of FIG. 5A also includes a second splitter 202 that divides the reference signal received from the reference waveguides 44 onto a first reference waveguide 210 and a second reference waveguide 208. The first reference waveguide 210 carries a first portion of the reference signal to the light-combining component 211. The second reference waveguide 208 carries a second portion of the reference signal to the second light-combining component 212.

The second light-combining component 212 combines the second portion of the comparative signal and the second portion of the reference signal into a second composite signal. Due to the difference in frequencies between the second portion of the comparative signal and the second portion of the reference signal, the second composite signal is beating between the second portion of the comparative signal and the second portion of the reference signal.

The second light-combining component 212 also splits the resulting second composite signal onto a first auxiliary detector waveguide 214 and a second auxiliary detector waveguide 216. The first auxiliary detector waveguide 214 carries a first portion of the second composite signal to a first auxiliary light sensor 218 that converts the first portion of the second composite signal to a first auxiliary electrical signal. The second auxiliary detector waveguide 216 carries a second portion of the second composite signal to a second auxiliary light sensor 220 that converts the second portion of the second composite signal to a second auxiliary electrical signal. Examples of suitable light sensors include germanium photodiodes (PDs), and avalanche photodiodes (APDs).

In some instances, the second light-combining component 212 splits the second composite signal such that the portion of the comparative signal (i.e. the portion of the second portion of the comparative signal) included in the first portion of the second composite signal is phase shifted by 180° relative to the portion of the comparative signal (i.e. the portion of the second portion of the comparative signal) in the second portion of the second composite signal but the portion of the reference signal (i.e. the portion of the second portion of the reference signal) in the second portion of the second composite signal is not phase shifted relative to the portion of the reference signal (i.e. the portion of the second portion of the reference signal) in the first portion of the second composite signal. Alternately, the second light-combining component 212 splits the second composite signal such that the portion of the reference signal (i.e. the portion of the second portion of the reference signal) in the first portion of the second composite signal is phase shifted by 180° relative to the portion of the reference signal (i.e. the portion of the second portion of the reference signal) in the second portion of the second composite signal but the portion of the comparative signal (i.e. the portion of the second portion of the comparative signal) in the first portion of the second composite signal is not phase shifted relative to the portion of the comparative signal (i.e. the portion of the second portion of the comparative signal) in the second portion of the second composite signal. Examples of suitable light sensors include germanium photodiodes (PDs), and avalanche photodiodes (APDs).

The first light-combining component 211 combines the first portion of the comparative signal and the first portion of the reference signal into a first composite signal. Due to the difference in frequencies between the first portion of the comparative signal and the first portion of the reference signal, the first composite signal is beating between the first portion of the comparative signal and the first portion of the reference signal.

The light-combining component 211 also splits the first composite signal onto a first detector waveguide 221 and a second detector waveguide 222. The first detector waveguide 221 carries a first portion of the first composite signal to a first light sensor 223 that converts the first portion of the second composite signal to a first electrical signal. The second detector waveguide 222 carries a second portion of the second composite signal to a second light sensor 224 that converts the second portion of the second composite signal to a second electrical signal. Examples of suitable light sensors include germanium photodiodes (PDs), and avalanche photodiodes (APDs).

In some instances, the light-combining component 211 splits the first composite signal such that the portion of the comparative signal (i.e. the portion of the first portion of the comparative signal) included in the first portion of the composite signal is phase shifted by 180° relative to the portion of the comparative signal (i.e. the portion of the first portion of the comparative signal) in the second portion of the composite signal but the portion of the reference signal (i.e. the portion of the first portion of the reference signal) in the first portion of the composite signal is not phase shifted relative to the portion of the reference signal (i.e. the portion of the first portion of the reference signal) in the second portion of the composite signal. Alternately, the light-combining component 211 splits the composite signal such that the portion of the reference signal (i.e. the portion of the first portion of the reference signal) in the first portion of the composite signal is phase shifted by 180° relative to the portion of the reference signal (i.e. the portion of the first portion of the reference signal) in the second portion of the composite signal but the portion of the comparative signal (i.e. the portion of the first portion of the comparative signal) in the first portion of the composite signal is not phase shifted relative to the portion of the comparative signal (i.e. the portion of the first portion of the comparative signal) in the second portion of the composite signal.

When the second light-combining component 212 splits the second composite signal such that the portion of the comparative signal in the first portion of the second composite signal is phase shifted by 180° relative to the portion of the comparative signal in the second portion of the second composite signal, the light-combining component 211 also splits the composite signal such that the portion of the comparative signal in the first portion of the composite signal is phase shifted by 180° relative to the portion of the comparative signal in the second portion of the composite signal. When the second light-combining component 212 splits the second composite signal such that the portion of the reference signal in the first portion of the second composite signal is phase shifted by 180° relative to the portion of the reference signal in the second portion of the second composite signal, the light-combining component 211 also splits the composite signal such that the portion of the reference signal in the first portion of the composite signal is phase shifted by 180° relative to the portion of the reference signal in the second portion of the composite signal.

The first reference waveguide 210 and the second reference waveguide 208 are constructed to provide a phase shift between the first portion of the reference signal and the second portion of the reference signal. For instance, the first reference waveguide 210 and the second reference waveguide 208 can be constructed so as to provide a 90 degree phase shift between the first portion of the reference signal and the second portion of the reference signal. As an example, one reference signal portion can be an in-phase component and the other a quadrature component. Accordingly, one of the reference signal portions can be a sinusoidal function and the other reference signal portion can be a cosine function. In one example, the first reference waveguide 210 and the second reference waveguide 208 are constructed such that the first reference signal portion is a cosine function and the second reference signal portion is a sine function. Accordingly, the portion of the reference signal in the second composite signal is phase shifted relative to the portion of the reference signal in the first composite signal, however, the portion of the comparative signal in the first composite signal is not phase shifted relative to the portion of the comparative signal in the second composite signal.

The first light sensor 223 and the second light sensor 224 can be connected as a balanced detector and the first auxiliary light sensor 218 and the second auxiliary light sensor 220 can also be connected as a balanced detector. For instance, FIG. 5B provides a schematic of the relationship between the electronics, the first light sensor 223, the second light sensor 224, the first auxiliary light sensor 218, and the second auxiliary light sensor 220. The symbol for a photodiode is used to represent the first light sensor 223, the second light sensor 224, the first auxiliary light sensor 218, and the second auxiliary light sensor 220 but one or more of these sensors can have other constructions. In some instances, all of the components illustrated in the schematic of FIG. 5B are included on the LIDAR chip. In some instances, the components illustrated in the schematic of FIG. 5B are distributed between the LIDAR chip and electronics located off of the LIDAR chip. A balanced detector can operate as a light sensor in that it converts and optical signal to an electrical signal.

The electronics connect the first light sensor 223 and the second light sensor 224 as a first balanced detector 225 and the first auxiliary light sensor 218 and the second auxiliary light sensor 220 as a second balanced detector 226. In particular, the first light sensor 223 and the second light sensor 224 are connected in series. Additionally, the first auxiliary light sensor 218 and the second auxiliary light sensor 220 are connected in series. The serial connection in the first balanced detector is in communication with a first data line 228 that carries the output from the first balanced detector as a first data signal. The serial connection in the second balanced detector is in communication with a second data line 232 that carries the output from the second balanced detector as a second data signal. The first data signal is an electrical representation of the first composite signal and the second data signal is an electrical representation of the second composite signal. Accordingly, the first data signal includes a contribution from a first waveform and a second waveform and the second data signal is a composite of the first waveform and the second waveform. The portion of the first waveform in the first data signal is phase-shifted relative to the portion of the first waveform in the first data signal but the portion of the second waveform in the first data signal being in-phase relative to the portion of the second waveform in the first data signal. For instance, the second data signal includes a portion of the reference signal that is phase shifted relative to a different portion of the reference signal that is included the first data signal. Additionally, the second data signal includes a portion of the comparative signal that is in-phase with a different portion of the comparative signal that is included in the first data signal. The first data signal and the second data signal are beating as a result of the beating between the comparative signal and the reference signal, i.e. the beating in the first composite signal and in the second composite signal.

The electronics 62 includes a transform mechanism 238 configured to perform a mathematical transform on the first data signal and the second data signal. For instance, the mathematical transform can be a complex Fourier transform with the first data signal and the second data signal as inputs. Since the first data signal is an in-phase component and the second data signal its quadrature component, the first data signal and the second data signal together act as a complex data signal where the first data signal is the real component and the second data signal is the imaginary component of the input.

The transform mechanism 238 includes a first Analog-to-Digital Converter (ADC) 264 that receives the first data signal from the first data line 228. The first Analog-to-Digital Converter (ADC) 264 converts the first data signal from an analog form to a digital form and outputs a first digital data signal. The transform mechanism 238 includes a second Analog-to-Digital Converter (ADC) 266 that receives the second data signal from the second data line 232. The second Analog-to-Digital Converter (ADC) 266 converts the second data signal from an analog form to a digital form and outputs a second digital data signal. The first digital data signal is a digital representation of the first data signal and the second digital data signal is a digital representation of the second data signal. Accordingly, the first digital data signal and the second digital data signal act
together as a complex signal where the first digital data
signal acts as the real component of the complex signal and
the second digital data signal acts as the imaginary compo-
nent of the complex data signal.

The transform mechanism 238 includes a mathematical
transformer 268 that receives the complex data signal. For
instance, the mathematical transformer 268 receives the first
digital data signal from the first Analog-to-Digital Converter
(ADC) 264 as an input and also receives the second digital
data signal from the first Analog-to-Digital Converter
(ADC) 266 as an input. The mathematical transformer 268
can be configured to perform a mathematical transform on
the complex signal so as to convert from the time domain to
the frequency domain. The mathematical transform can be a
complex transform such as a complex Fast Fourier Trans-
form (FFT). A complex transform such as a complex Fast
Fourier Transform (FFT) provides an unambiguous solution
for the shift in frequency of a comparative signal relative to
the system output signal.

The transform mechanism 238 includes a peak finder 270
that receives output from the mathematical transformer 268.
The peak finder 270 find a peak in the output of the
mathematical transformer 268 in order to identify one or
more peaks in the beat frequency of the composite optical
signal.

Figure 5C:
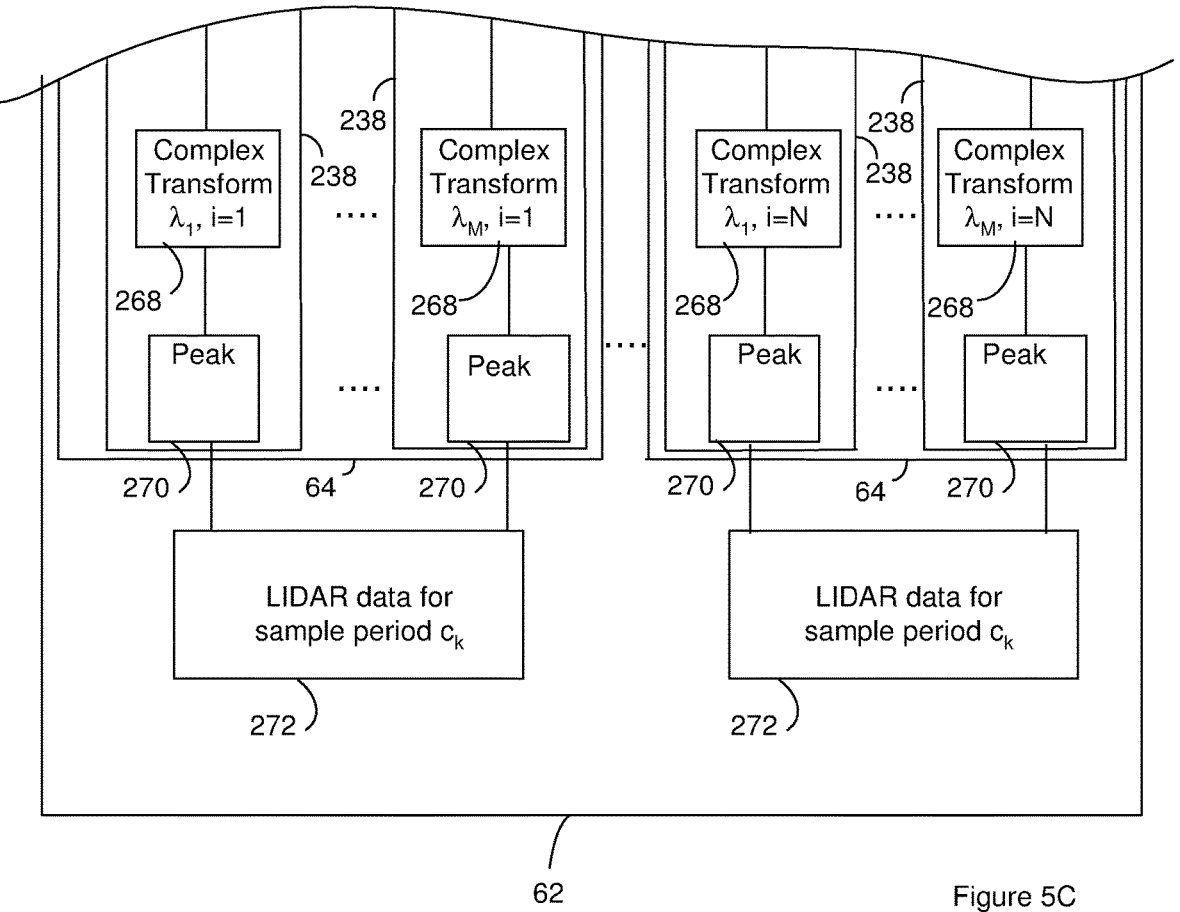
FIG. 5C illustrates a portion of the electronics that includes components from multiple different signal processors.

The electronics are configured to combine the output from
different signal processors 34 to generate the LIDAR data.
For instance, the electronics can combine the beat frequen-
cies from different signal processors 34 to generate the
LIDAR data. In particular, the electronics can combine the
beat frequencies of multiple wavelength channels that are
associated with the same switch channel to generate the
LIDAR data for an output period. For instance, FIG. 5C
illustrates a portion of the electronics that includes the
mathematical transformers 268 from different signal proces-
sors.

The mathematical transformers 268 are shown arranged in
different switch channel groups 64. As a result, the math-
ematical transformers 268 in the same switch channel group
receives are each associated with different wavelength chan-
nels but the same switch channel. Accordingly, each of the
mathematical transformers 268 is labeled with the wave-
length channel index ($\lambda_j$) and the switch channel index (j)
associated with the mathematical transformer.

The electronics include multiple LIDAR data generators
272. Each of the LIDAR data generators 272 receives beat
frequencies from the peak finders 270 in the same switch
channel group 64. For instance, the electronics are config-
ured such that one of the LIDAR data generators 272
receives the beat frequencies associated with different wave-
length channels ($\lambda_1$ through $\lambda_M$) and also associated with
channel i=1 while another one of the LIDAR data generators
272 receives the beat frequencies associated with different
wavelength channels ($\lambda_1$ through $\lambda_M$) and also associated
with channel i=2. As a result, each of the LIDAR data
generators 272 can be associated with a different one of the
switch channels.

Each of the LIDAR data generators 272 combines the beat
frequencies from the different wavelength channels that
result from the same output period to generate the LIDAR
data for that output period. For instance, the following
equation applies to a wavelength channel where the fre-
quency of the system output signal carrying that channel
increases during the output period such as occurs with the
LIDAR output signal $\lambda_1$ of FIG. 5B during output period $c_1$:
$+f_{ub}=f_d+\alpha\tau_0$ where $f_{ub}$ is the beat frequency that one of the peak finders outputs for the channel during the output
period, $f_d$ represents the Doppler shift ($f_d=2Vf_0/c$) where $f_c$
is the frequency of the LIDAR output signal at the start of
the output period, v is the radial velocity between the
reflecting object and the LIDAR chip where the direction
from the reflecting object toward the chip is assumed to be
the positive direction, and c is the speed of light, $\alpha$ repre-
sents the rate at which the frequency of the outgoing LIDAR
signal is increased or decreased during the output period,
and $\tau_0$ is the roundtrip delay (time between the system output
signal exiting from the LIDAR system and the system return
signal returning to the LIDAR system) for a stationary
reflecting object. The following equation applies to a chan-
nel where the frequency of the system output signal carrying
that channel decreases during the output period such as
occurs with the LIDAR output signal $\lambda_2$ of FIG. 5B during
output period $c_1$: $-f_{db}=-f_d-\alpha\tau_0$ where $f_{db}$ is the beat fre-
quency that one of the peak finders outputs for the channel
during the output period. In these two equations, $f_d$ and $\tau_0$ are
unknowns. These two equations are solved for the two
unknowns $f_d$ and $\tau_0$. The values of $f_{db}$ and $f_{ub}$ that are
substituted into the solution come from different signal
processors 34 because the value of $f_{db}$, is generated from a
LIDAR output signal carrying a different wavelength chan-
nel than the LIDAR output signal from which the value of
$f_{ub}$ is generated. The different wavelength channels are
concurrently incident on the same sample region. The radial
velocity for an output period can then be determined from
the Doppler shift ($v=c*f_d/(2f_c)$) and the separation distance
for that sample region can be determined from $c*\tau_0/2$. As a
result, the LIDAR data for a single output period can be
determined using wavelength channels received at different
signal processors.

As noted above, the LIDAR system can be configured to
operate at a maximum operational distance. When generat-
ing the LIDAR data, the electronics can filter out beat
frequencies that are output from a peak finder with fre-
quency above a threshold associated with the maximum
operational distance. For instance, the electronics can dis-
regard beat frequencies that are output from a peak finder
with frequency above the threshold.

As discussed above, the LIDAR system can output a
system output signal that carries two or more wavelength
channels. For instance, the LIDAR system can carry three
channels that have frequency versus time waveforms
according to FIG. 4A and FIG. 4B. This may be desirable in
situations where a composite optical signal carries light
reflected by multiple different objects during an output
period. Different reflecting objects in a sample region need
not be physically separate items but can be different surfaces
of the same item that are located different distances from the
LIDAR system and/or are moving at different radial veloci-
ties relative to the LIDAR system as might occur with a
jagged object that is both rotating and translating relative to
the LIDAR system.

In situations where a composite optical signal carries light
reflected by multiple different objects during an output
period, a mathematical transformers 268 can output more
than one frequency value where each of the different fre-
quency values is associated with a different one of the
reflecting objects. In these instances, it may be necessary to
match the beat frequencies provided by the peak finders 270
in different signal processors. The matching is performed
such that the matched frequencies are frequencies from the
same reflecting object. The use of additional channels such
as $\lambda_3$ can be used to match frequencies. LIDAR data can be generated for each pair of matched frequencies and is considered and/or processed as the LIDAR data for the different reflecting objects.

One example of a LIDAR system includes a light source configured to generate a system output signal carrying three wavelength channels. One of the system output signals carries a wavelength channel with a frequency versus time according to channel $\lambda_1$ of FIG. 4A, another LIDAR output signal carries a channel with a frequency versus time according to channel $\lambda_2$ of FIG. 4A, and another LIDAR output signal carries a channel with a frequency versus time according to channel $\lambda_3$ of FIG. 4A. In this instance, the beat frequency output from the peak finders associated with the signal processor that receives the channel $\lambda_3$ is: $f_3 = -f_d + \alpha'' \tau_0$ where $f_d$ represents the Doppler shift, $\alpha''$ represents the rate at which the frequency of the LIDAR output signal $\lambda_3$ is increased or decreased during the output period, and $\tau_0$ is the roundtrip delay. When the frequency versus time for $\lambda_3$ is according to FIG. 4B, $\alpha'' = 0$ and this equation reduces $f_3 = -f_d$. The equation for $f_3$ can be used to generate a theoretical $f_3$ for at least a portion of the possible frequency pairs and the theoretical $f_3$ values can be compared to the actual $f_3$ values provided by the peak finders associated with the signal processor that receives the channel $\lambda_3$. The frequency pair that provides a theoretical $f_3$ value closest to the actual $f_3$ value is considered a matching pair. LIDAR data can be generated for each of the matching pairs and the LIDAR data from the matching pairs can be considered and/or processed as the LIDAR data for each of the different reflecting objects in the sample region.

As one example of the identification of matching pairs, the mathematical transformers 168 associated with the signal processor 34 that receives the wavelength channel $\lambda_1$ outputs two different frequencies for $f_{db}$: $f_{d11}$ and $f_{d12}$. Additionally, the peak finders associated with the signal processor that receives the channel $\lambda_2$ outputs two different frequencies for $f_{db}$: $f_{d21}$ and $f_{d22}$. In this instance, the possible frequency pairings are: $(f_{d11}, f_{d21})$; $(f_{d11}, f_{d22})$; $(f_{d12}, f_{d21})$; and $(f_{d12}, f_{d22})$. A value of $f_d$ and $\tau_0$ can be calculated for each of the four possible frequency pairings as described above. Each pair of values for $f_d$ and $\tau_0$ can be substituted into $f_3 = f_d + \alpha'' \tau_0$ to generate a theoretical $f_3$ for each of the possible frequency pairings. As noted above, when $\alpha'' = 0$, the equation reduces $f_2 = -f_d$. In these instances, there is no need to calculate $\tau_0$ for the possible frequency pairings. The mathematical transformers 168 associated with the signal processor that receives the channel $\lambda_3$ also outputs two values for $f_3$ that are each treated as an actual $f_3$ value. The frequency pair with a theoretical $f_3$ value closest to each of the actual $f_3$ values is considered a matching pair. LIDAR data can be generated for each of the matching pairs as described above and is considered and/or processed as the LIDAR data for a different one of the reflecting objects in the sample region.

Although the mathematical transformers 268 are disclosed as performing complex transforms on a complex signal, the complex transforms can be replaced with real transforms performed on real signals. As a result, the optical-to-electrical assembly of FIG. 5A can be simplified so as to exclude the second light-combining component 212, the comparative waveguide 206, the second splitter 202, and the second reference waveguide 208.

Figures 6A, 6B:
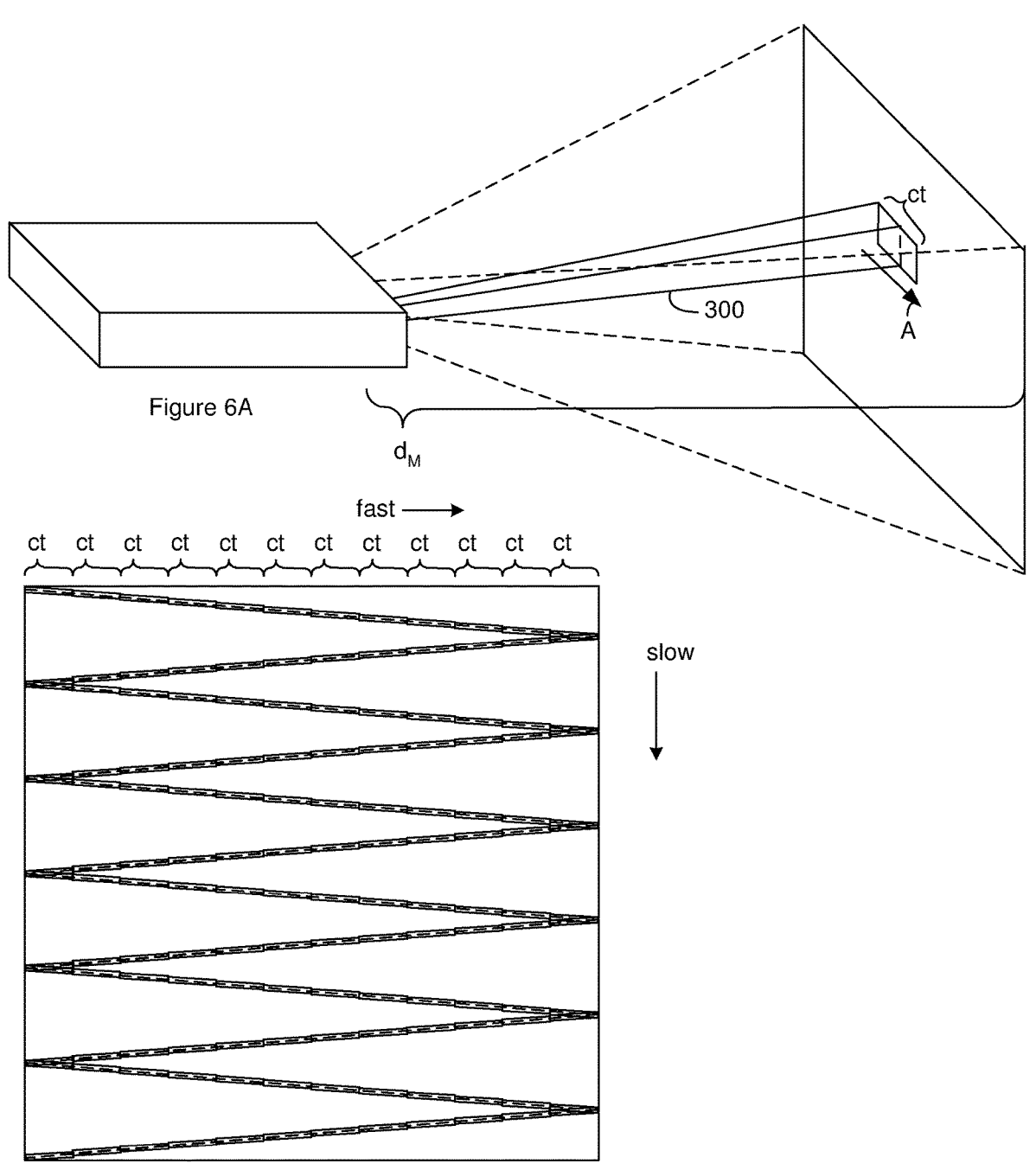
FIG. 6A is a schematic of the relationship between a LIDAR system that includes a single LIDAR core (not shown) and the field of view.
FIG. 6B is a sideview of the imaginary plane from FIG. 6A.

FIG. 6A is a schematic of the relationship between a LIDAR system that includes a single LIDAR core (not shown) and the field of view. The field of view is represented by the dashed lines that extend from the LIDAR system to an imaginary surface within the field of view. In order to show the extent of the field of view, the imaginary surface is positioned at a maximum operational distance (labeled $d_M$) from the LIDAR system.

As noted above, the LIDAR system can include one or more beam directors (not shown in FIG. 6A through FIG. 6C) that steer the system output signal to different sample regions 300 in the field of view. A portion of a sample region is illustrated by the rectangle on the plane of FIG. 6A. The electronics generate LIDAR data in a series of cycles by sequentially illuminating different sample regions in the field of view for the LIDAR system. LIDAR data can generated for each of the sample regions.

In FIG. 6A, only a portion of the illustrated sample region is shown as illuminated by the system output signal because the system output signal can continue to be scanned during the output period associated with the sample region. For instance, the system output signal in FIG. 6A can be scanned in the direction of the arrow labeled A for the duration of an output period. This scan can cause the system output signal to illuminate the length of the plane labeled ct during the output period.

FIG. 6B is a sideview of the imaginary plane from FIG. 6A. The LIDAR system can include multiple steering mechanisms (not shown in FIG. 6A through FIG. 6C) that steer the system output signal to different sample regions in the field of view. The dashed line in FIG. 6B represents the path that the centroid of the system output signal carrying switch channel $SC_2$ travels across the plane in the field of view in response to steering of the system output signal by only the one or more beam directors 78 disclosed in the context of FIG. 3. The sample regions 300 are represented by the rectangles positioned along path of the system output signal.

The scan path of the system output signal shown in FIG. 6B has a fast axis illustrated by the arrow labeled "fast" in FIG. 6B. The scan path of the system output signal shown in FIG. 6B has a slow axis illustrated by the arrow labeled "slow" in FIG. 6B. The scan speed of the system output signal in the direction of the fast axis is faster than the scan speed of the system output signal in the direction of the slow axis.

In order to have LIDAR data results that represent the entire field of view, it is generally desirable for the number of sample regions in the direction of the fast axis to match the number of sample regions in the direction of the slow axis. The scanning speed in the fast direction can increased so as to increase the number of zigzags that the system output signals travels across the field of view. The increased number of zigzags provides an increased number of sample regions in the direction of the fast axis. However, as the applications for LIDAR systems have increased, the size that is desired for the field of view and the maximum operational distance have increased to dimensions where the scan speed that is required of the one or more beam directors 78 is not possible or practical and/or has undesirably high power requirements.

Figure 6C:
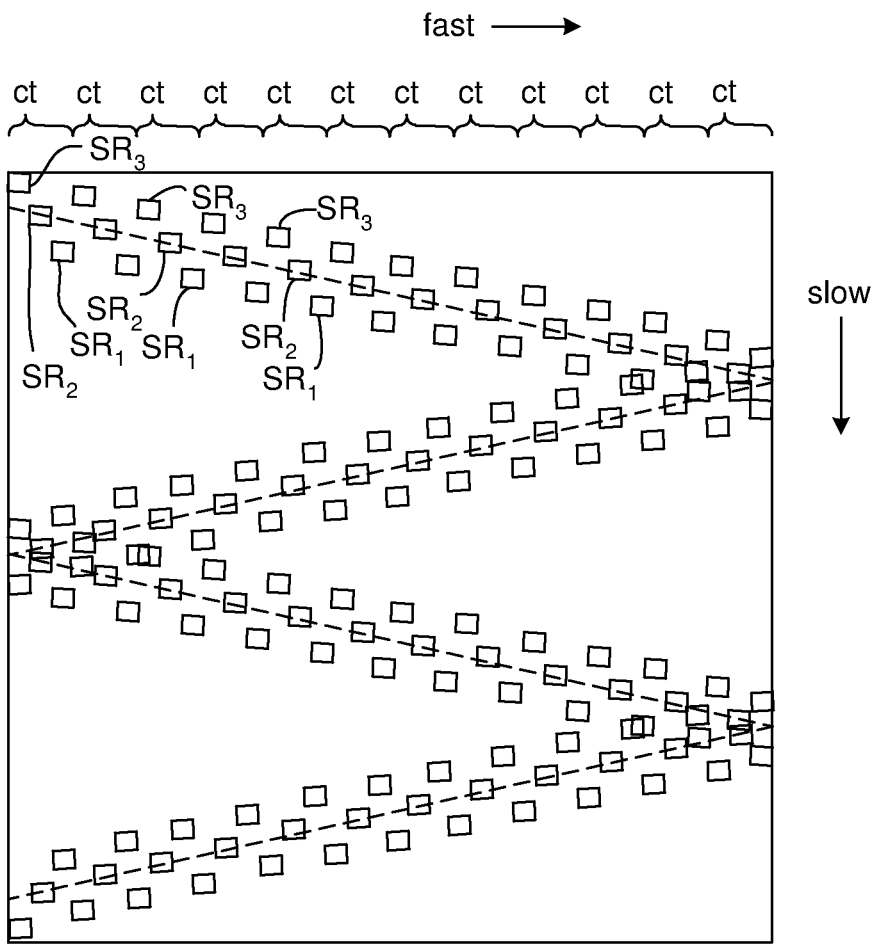
FIG. 6C is another possible sideview of the imaginary plane from FIG. 6A.

FIG. 6C is a sideview of the imaginary plane from FIG. 6A. The dashed line in FIG. 6C represents the path that the centroid of the system output signal when the system output signal carrying switch channel $SC_2$ is steered by only the one or more beam directors 78 (the beam director) disclosed in the context of FIG. 3. The sample regions of FIG. 6C are vertically separated from one another and from the path provided by the beam director as illustrated by the dashed lines. The vertical separation results from the electronics operating the signal director 14 so as to change the direction that the system output signal travels away from the LIDAR system. As a result, the operation of the signal director 14 moves the system output signal in a direction that is transverse to the path provided by the beam director. For instance, the sample regions 129 labeled $SR_i$ can represent the sample region when the signal director 14 is operated such that the system output signal carries channel $C_i$. As is evident from the sample region sequence shown in FIG. 6C, the signal director 14 is operated such that the system output signals sequentially carry the switch channels $C_i$ in the sequence i=1 through N and the sequence is repeated. Although FIG. 6C illustrates the switch channel sequence in the forward order, the channel sequence can be repeated in reverse order. As a result, forward order sequences (i=1 through N) can be alternated with reverse order sequences i=N through 1).

The scanning speed on the fast axis can be slowed relative to the fast axis scanning speed of FIG. 6B while retaining the same frame rate (rate at which each of the sample regions in the field of view is illuminated by the system output signal). For instance, the fast axis scanning speed of FIG. 6C is about 1/N times the fast axis fast axis scanning speed of FIG. 6B where N is the number of alternate waveguides 16. The reduced fast axis scanning speed is evident from the reduced number of zigzags within the same frame scan time (1/frame rate). As a result of the reduced fast axis scanning speed, sample regions have a reduced length in the direction of the fast axis and accordingly have a reduced size. The reduced size of the sample regions leads to increased LIDAR data reliability.

In FIG. 6B, the distance that the system output signal travels along the fast axis during the duration of each switch sequence is labeled ct. That same distance is also labeled ct in FIG. 6C. Within each distance labeled ct in FIG. 6B and FIG. 6C, there are 12 sample regions spread out across the slow axis. As a result, the combination of using the signal director 14 to steer the system output signal and the reduced fast axis scan speed can provide the same slow axis resolution as increasing the fast axis scan speed.

The fast axis scanning speed (speed that the beam director provides in the direction of the fast axis) can be represented by the rate of angular change in the direction that the system output signal travels away from the LIDAR system in the direction of the fast axis (the fast axis angular rate of change). The slow axis scanning speed (speed that the beam director provides in the direction of the slow axis) can be represented by the rate of angular change in the direction that the system output signal travels away from the LIDAR system in along the slow axis (the slow axis angular rate change). The slow and axis and fast axis can be perpendicular to one another. In some instances, a ratio of the fast axis angular rate of change: the slow axis angular rate of change is greater than 1:1, 2:1, 3:1, or 4:1 and/or less than 5:1, 10:1, or 100:1. Additionally, or alternately, the fast axis angular rate of change can be greater than 100 degrees/second, 200 degrees/second, or 300 degrees/second and/or less than 500 degrees/second, 1000 degrees/second, or and 2000 degrees/second and/or the slow axis angular rate of change can be greater than 20 degrees/second, 50 degrees/second, or 100 degrees/second and/or less than 200 degrees/second, 500 degrees/second, or and 1000 degrees/second.

Although FIG. 6B and FIG. 6C, illustrates the one or more beam directors 78 steering the system output signal on a zigzag path back and forth across the field of view, the one or more beam directors 78 can steer the system output signal back and forth across the field of view using other patterns. For instance, the path need not include straight segments connected at sharp angles but can instead include straight segments connected by curves. Alternately, the path can include curves and/or curved segments and can exclude straight segments. For instance, the path can be configured as a series of s-shaped sections.

FIG. 6A through FIG. 6C illustrated a field of view for a LIDAR system with a single core. When a LIDAR system has multiple cores, the fields of view for different cores can be stitched together to form the field of view for the LIDAR system.

Figure 7:
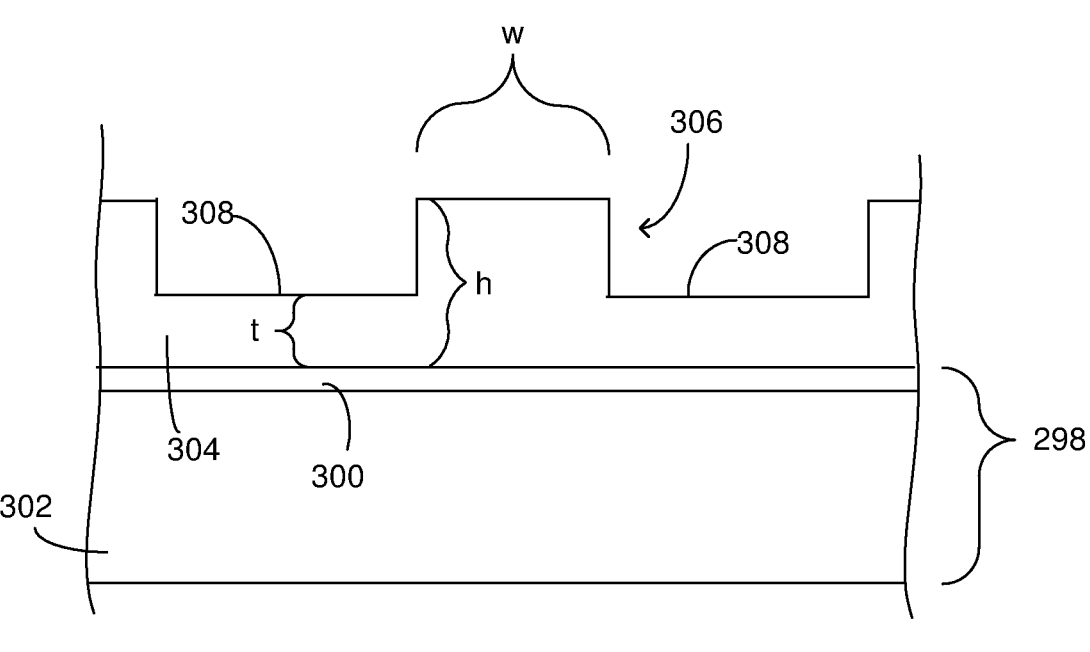
FIG. 7 is a cross section of a silicon-on-insulator wafer.

Suitable platforms for the LIDAR chip include, but are not limited to, silica, indium phosphide, and silicon-on-insulator wafers. FIG. 7 is a cross section of a silicon-on-insulator wafer. A silicon-on-insulator (SOI) wafer includes a buried layer 300 between a substrate 302 and a light-transmitting medium 304. In a silicon-on-insulator wafer, the buried layer 300 is silica while the substrate 302 and the light-transmitting medium 304 are silicon. The substrate of an optical platform such as an SOI wafer can serve as the base for a LIDAR chip. For instance, in some instances, the optical components shown in FIG. 1 can be positioned on or over the top and/or lateral sides of the same substrate.

The portion of the LIDAR chip illustrated in FIG. 7 includes a waveguide construction that is suitable for use with chips constructed from silicon-on-insulator wafers. A ridge 306 of the light-transmitting medium 304 extends away from slab regions 308 of the light-transmitting medium 304. The light signals are constrained between the top of the ridge and the buried layer 300. As a result, the ridge 306 at least partially defines the waveguide.

The dimensions of the ridge waveguide are labeled in FIG. 7. For instance, the ridge has a width labeled w and a height labeled h. A thickness of the slab regions is labeled t. For LIDAR applications, these dimensions can be more important than other applications because of the need to use higher levels of optical power than are used in other applications. The ridge width (labeled w) is greater than 1 μm and less than 4 μm, the ridge height (labeled h) is greater than 1 μm and less than 4 μm, the slab region thickness is greater than 0.5 μm and less than 3 μm. These dimensions can apply to straight or substantially straight portions of the waveguide, curved portions of the waveguide and tapered portions of the waveguide(s). Accordingly, these portions of the waveguide will be single mode. However, in some instances, these dimensions apply to straight or substantially straight portions of a waveguide. Additionally or alternately, curved portions of a waveguide can have a reduced slab thickness in order to reduce optical loss in the curved portions of the waveguide. For instance, a curved portion of a waveguide can have a ridge that extends away from a slab region with a thickness greater than or equal to 0.0 μm and less than 0.5 μm. While the above dimensions will generally provide the straight or substantially straight portions of a waveguide with a single-mode construction, they can result in the tapered section(s) and/or curved section(s) that are multi-mode. Coupling between the multi-mode geometry to the single mode geometry can be done using tapers that do not substantially excite the higher order modes. Accordingly, the waveguides can be constructed such that the signals carried in the waveguides are carried in a single mode even when carried in waveguide sections having multi-mode dimensions. The waveguide construction of FIG. 7 is suitable for all or a portion of the waveguides on a LIDAR chip constructed according to FIG. 1.

Figure 8A:
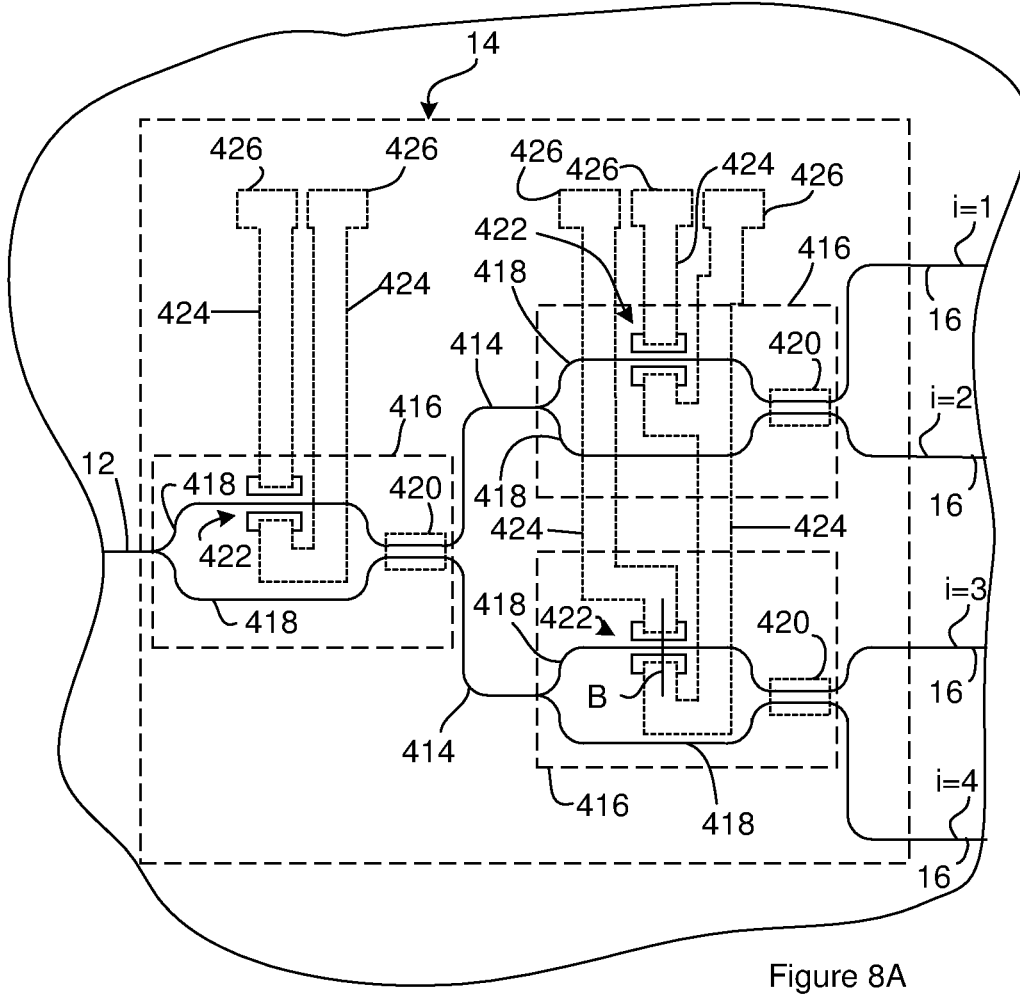
FIG. 8A and FIG. 8B illustrate an example of an optical switch that includes cascaded Mach-Zehnder interferometers.
Figure 8B:
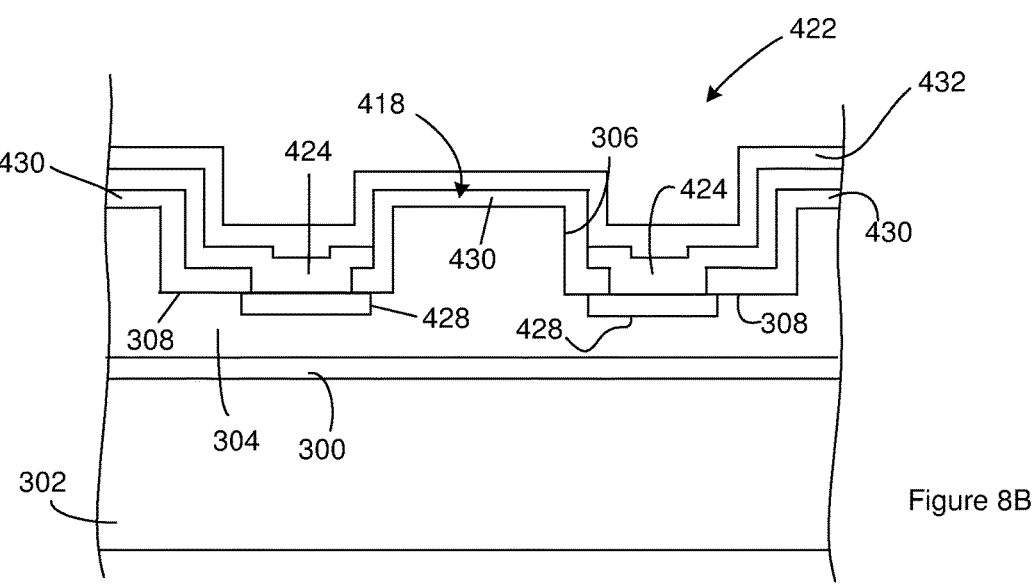

Suitable signal directors 14 for use with the LIDAR chip include, but are not limited to, optical switches such as cascaded Mach-Zehnder interferometers and micro-ring resonator switches. In one example, the signal director 14 includes cascaded Mach-Zehnder interferometers that use thermal or free-carrier injection phase shifters. FIG. 8A and FIG. 8B illustrate an example of an optical switch that includes cascaded Mach-Zehnder interferometers 416. FIG. 8A is a topview of the optical switch. FIG. 8B is a cross section of the optical switch shown in FIG. 8A taken along the line labeled B in FIG. 8A.

The optical switch receives the outgoing LIDAR signal from the utility waveguide 12. The optical switch is configured to direct the outgoing LIDAR signal to one of several alternate waveguides 16. The optical switch includes interconnect waveguides 414 that connect multiple Mach-Zehnder interferometers 416 in a cascading arrangement. Each of the Mach-Zehnder interferometers 416 directs the outgoing LIDAR signal to one of two interconnect waveguides 414. The electronics can operate each Mach-Zehnder so as to select which of the two interconnect waveguides 414 receives the outgoing LIDAR signal from the Mach-Zehnder interferometer 416. The interconnect waveguides 414 that receive the outgoing LIDAR signal can be selected such that the outgoing LIDAR signal is guided through the optical switch to a particular one of the alternate waveguides 16.

Each of the Mach-Zehnder interferometers 416 includes two branch waveguides 418 that each receives a portion of the outgoing LIDAR signal from the utility waveguide 12 or from an interconnect waveguide 414. Each of the Mach-Zehnder interferometers 416 includes a direction component 420 that receives two portions of the outgoing LIDAR signal from the branch waveguides 418. The direction component 420 steers the outgoing LIDAR signal to one of the two interconnect waveguides 414 configured to receive the outgoing LIDAR signal from the direction component 420. The interconnect waveguide 414 to which the outgoing LIDAR signal is directed is a function of the phase differential between the two different portions of the outgoing LIDAR signal received by the direction component 420. Although FIG. 8A illustrates a directional coupler operating as the direction component 420, other direction components 420 can be used. Suitable alternate direction components 420 include, but are not limited to, Multi-Mode Interference (MIMI) devices and tapered couplers.

Each of the Mach-Zehnder interferometers 416 includes a phase shifter 422 positioned along one of the branch waveguides 418. The output component includes conductors 424 in electrical communication with the phase shifters 422. The conductors 424 are illustrated as dashed lines so they can be easily distinguished from underlying features. The conductors 424 each terminate at a contact pad 426. The contact pads 426 can be used to provide electrical communication between the conductors 424 and the electronics. Accordingly, the conductors 424 provide electrical communication between the electronics and the phase shifters 422 and allow the electronics to operate the phase shifters 422. Suitable conductors 424 include, but are not limited to, metal traces. Suitable materials for the conductors include, but are not limited to, titanium, aluminum and gold.

The electronics can operate each of the phase shifters 422 so as to control the phase differential between the portions of the outgoing LIDAR signal received by a direction component 420. In one example, a phase shifter 422 can be operated so as to change the index of refraction of a portion of at least a portion of a branch waveguide 418. Changing the index of a portion of a branch waveguide 418 in a Mach-Zehnder interferometer 416, changes the effective length of that branch waveguides 418 and accordingly changes the phase differential between the portions of the outgoing LIDAR signal received by a direction component 420. The ability of the electronics to change the phase differential allows the electronics to select the interconnect waveguide 414 that receives the outgoing LIDAR signal from the direction component 420.

FIG. 8B illustrates one example of a suitable construction of a phase shifter 422 on a branch waveguide 418. The branch waveguide 418 is at least partially defined by a ridge 306 of the light-transmitting medium 304 that extends away from slab regions 308 of the light-transmitting medium 304. Doped regions 428 extend into the slab regions 308 with one of the doped regions including an n-type dopant and one of the doped regions 428 including a p-type dopant. A first cladding 430 is positioned between the light-transmitting medium 304 and a conductor 424. The conductors 424 each extend through an opening in the first cladding 430 into contact with one of the doped regions 428. A second cladding 432 is optionally positioned over the first cladding 430 and over the conductor 424. The electronics can apply a forward bias can be applied to the conductors 424 so as to generate an electrical current through the branch waveguide 418. The resulting injection of carriers into the branch waveguide 418 causes free carrier absorption that changes the index of refraction in the branch waveguide 418.

The first cladding 430 and/or the second cladding 432 illustrated in FIG. 8B can each represent one or more layers of materials. The materials for the first cladding 430 and/or the second cladding 432 can be selected to provide electrical isolation of the conductors 424, lower index of refraction relative to the light-transmitting medium 304, stress reduction and mechanical and environmental protection. Suitable materials for the first cladding 430 and/or the second cladding 432 include, but are not limited to, silicon nitride, tetraorthosilicate (TEOS), silicon dioxide, silicon nitride, and aluminum oxide. The one or more materials for the first cladding 430 and/or the second cladding 432 can be doped or undoped.

Figure 9:
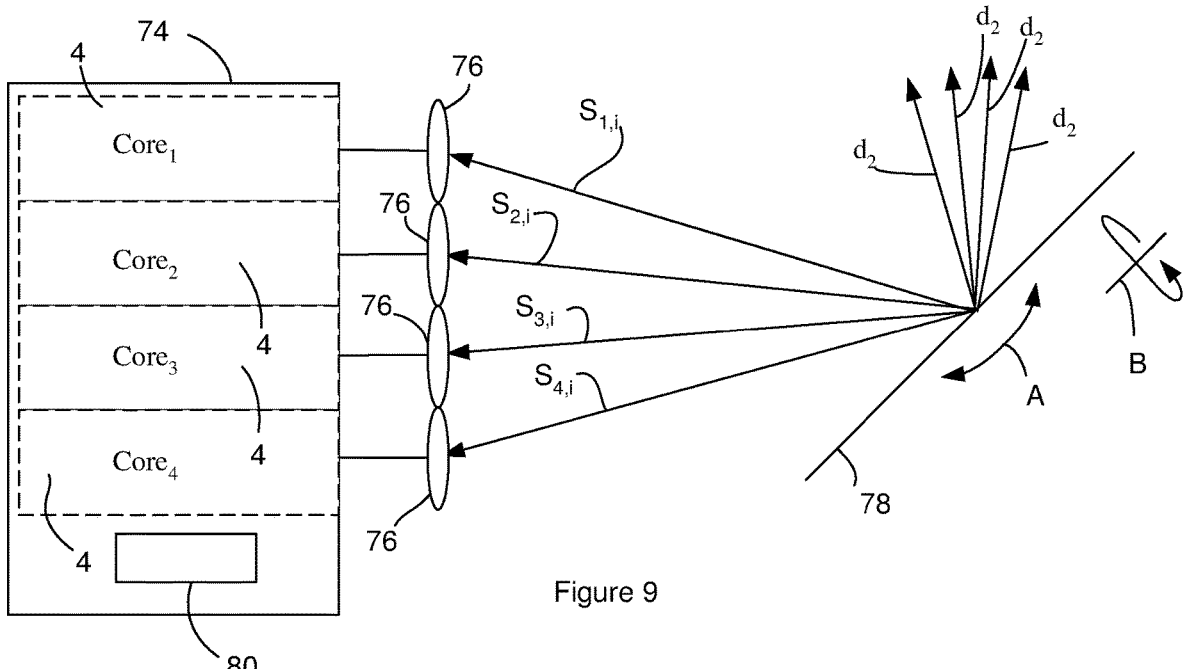
FIG. 9 illustrates the LIDAR system of FIG. 3 modified to have multiple signal directors that each receives LIDAR output signals from a different core.

In instances where the LIDAR system includes multiple cores, the LIDAR system can include multiple signal directors 76 and different signal directors 76 can receive LIDAR output signals from different selections of the cores. As an example, FIG. 9 illustrates the LIDAR system of FIG. 3 modified to have multiple signal directors 76 that each receives LIDAR output signals from a different one of the cores.

Figure 10:
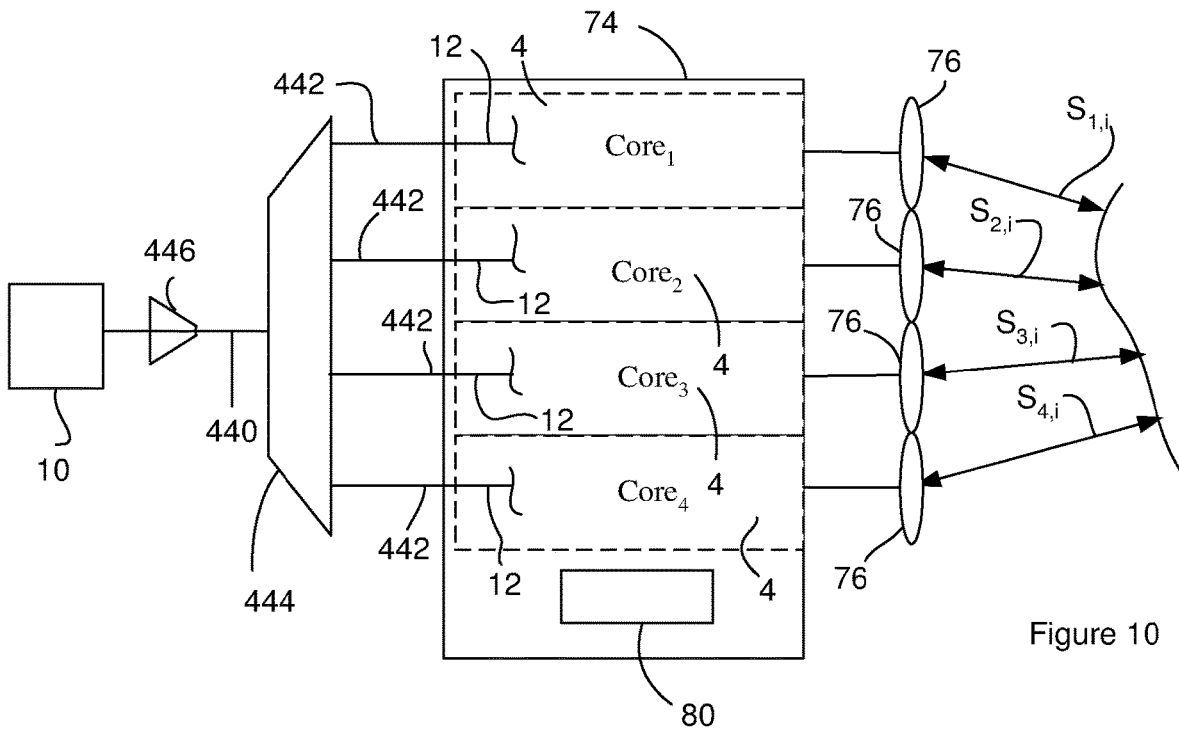
FIG. 10 illustrates the LIDAR system of FIG. 3 where a light source is located external to the chip.

FIG. 1 illustrates each of the cores including a different light source 10. However, the multiple cores, all of the cores, or a portion of the cores can receive the outgoing LIDAR signal from a common light source. In some instances, the cores are arranged in groups where each core in a group receives the outgoing LIDAR signal from the same common light source and the cores in different groups receives the outgoing LIDAR signal from the different common light sources. In some instances, a group of cores can include a single one of the cores. As an example, FIG. 10 illustrates the LIDAR system of FIG. 3 where a light source 10 is located external to the cores and each of the cores receives an outgoing LIDAR signal from the light source. The light source 10 can be constructed as disclosed in the context of FIG. 2.

A first optical link 440 provide optical communication between the light source 10 and a signal splitter 442. Second optical links 444 provide optical communication between the signal splitter 442 and the utility waveguides 12 on different cores 4. The light source 10 outputs a preliminary signal that is received on the first optical link 440. The signal splitter 442 receives the preliminary signal from the first optical link 440. The signal splitter 442 splits the preliminary signal into a split signals that are each received on a different one of the second optical links 444. Each of the utility waveguides 12 receive a split signal from a different one of the optical links 444. The portion of a split signal that enters a utility waveguide serves as the outgoing LIDAR signal.

The LIDAR system can optionally include an amplifier 446 positioned along the first optical link 440 so as to amplify the power of the preliminary signal. Suitable amplifiers 446 for use along an optical link, include, but are not limited to, SOAs, Erbium Doped Fiber Amplifiers (EDFAs), and Preasodymium Doped Fiber Amplifiers (PDFAs).

When it is desirable for the different outgoing LIDAR signals to have the same or substantially the same distribution of wavelengths, suitable signal splitters 442 include, but are not limited to, wavelength independent signal combiners such as an optical couplers, y-junctions, MMIs, cascaded evanescent optical couplers, and cascaded y-junctions. When it is desirable for the different outgoing LIDAR signals to have different wavelength distributions, suitable signal splitters 442 include, but are not limited to, wavelength dependent signal splitters 442 including optical demultiplexers such as Arrayed Waveguide Gratings (AWGs), and echelle gratings.

In some instances where multiple different cores receive an outgoing LIDAR signal from a common light source, only one of the cores that receives its outgoing LIDAR signal from the common light source includes a control branch. As a result, the other cores that receives an outgoing LIDAR signal from the same common light source can exclude the directional coupler 66, control waveguide 68, and control components 70 illustrated in FIG. 1.

As is evident from FIG. 1, the LIDAR system can optionally include one or more light signal amplifiers 446. For instance, an amplifier 446 can optionally be positioned along a utility waveguide as illustrated in the LIDAR system of FIG. 1. In another example, an amplifier 446 is optionally positioned along all or a portion of the alternate waveguides 16 as illustrated in the LIDAR system of FIG. 1B. The electronics can operate the amplifier 446 so as to amplify the power of the outgoing LIDAR signal and accordingly of the system output signal. The electronics can operate each of the amplifiers 446 so as to amplify the power of the outgoing LIDAR signal. Suitable amplifiers 446 for use on the LIDAR chip, include, but are not limited to, Semiconductor Optical Amplifiers (SOAs).

The amplifiers 446 shown in FIG. 1 are each positioned before one of the splitters 24. In some instances, this location of the amplifiers 446 can cause saturation of one or more components selected from a group consisting of the first auxiliary light sensor 218, the second auxiliary light sensor 220, the first light sensor 223, and the second light sensor 224. For instance, the amplifier 446 can increase power level of the reference signal to a level where saturation occurs. A beam dump can be used to reduce the power level of the reference signal to a level where saturation is reduced or eliminated.

As is evident from FIG. 5B, the LIDAR system can optionally include one or more electrical signal amplifiers 447. Each of the amplifiers 447 is positioned so as to provide amplification of a first data signal traveling between a first light sensor such as a first balanced detector 225 and an analog to digital converter or a second data signal traveling between a second light sensor such as a second balanced detector 226 and an analog to digital converter. Although FIG. 3D illustrates each of the electrical signal amplifiers 447 positioned along a first data line 228 or a second data line 232, the electrical signal amplifiers 447 can be positioned along a common data line 273 or a second common data line 275. Although FIG. 3E illustrates each of the electrical signal amplifiers 447 positioned along a common data line 273 or a second common data line 275, the electrical signal amplifiers 447 can be positioned along a first data line 228 or a second data line 232. Suitable electrical signal amplifiers 447 include, but are not limited to, Transimpedance Amplifiers (TIAs).

Figure 11:
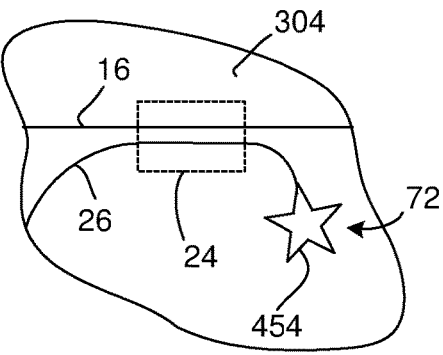
FIG. 11 illustrates a portion of a LIDAR chip that includes a reference waveguide used in conjunction with a beam dump.

FIG. 11 illustrates a portion of a LIDAR chip that includes a beam dump 72 configured to scatter a coupled portion of the outgoing LIDAR signal without reflecting a substantial amount of the coupled portion of the outgoing LIDAR signal back into the alternate waveguide 16. For instance, the beam dump 72 can be a recess 454 etched into the light-transmitting medium 304 of a silicon-on-insulator wafer to a depth where the dump signal is incident on one or more lateral sides of the recess 454. The recess 454 can be shaped so as to cause scattering of the dump signal. For instance, the recess 454 can have the shape of a star, or can include any number of irregularly positioned lateral sides. In some instances, the recess 454 can extends through the light transmitting to medium to an underlying layer such as the buried layer of a silicon-on-insulator wafer.

Light sensors that are interfaced with waveguides on a LIDAR chip can be a component that is separate from the chip and then attached to the chip. For instance, the light sensor can be a photodiode, or an avalanche photodiode. Examples of suitable light sensor components include, but are not limited to, InGaAs PIN photodiodes manufactured by Hamamatsu located in Hamamatsu City, Japan, or an InGaAs APD (Avalanche Photo Diode) manufactured by Hamamatsu located in Hamamatsu City, Japan. These light sensors can be centrally located on the LIDAR chip. Alternately, all or a portion the waveguides that terminate at a light sensor can terminate at a facet located at an edge of the chip and the light sensor can be attached to the edge of the chip over the facet such that the light sensor receives light that passes through the facet. The use of light sensors that are a separate component from the chip is suitable for all or a portion of the light sensors selected from the group consisting of the first light sensor and the second light sensor.

As an alternative to a light sensor that is a separate component, all or a portion of the light sensors can be integrated with the chip. For instance, examples of light sensors that are interfaced with ridge waveguides on a chip constructed from a silicon-on-insulator wafer can be found in Optics Express Vol. 15, No. 21, 13965-13971 (2007); U.S. Pat. No. 8,093,080, issued on Jan. 10, 2012; U.S. Pat. No. 8,242,432, issued Aug. 14, 2012; and U.S. Pat. No. 6,108, 472, issued on Aug. 22, 2000 each of which is incorporated herein in its entirety. The use of light sensors that are integrated with the chip are suitable for all or a portion of the light sensors selected from the group consisting of the first light sensor and the second light sensor.

Suitable electronics 62 for use in the LIDAR system can include, but are not limited to, a controller that includes or consists of analog electrical circuits, digital electrical circuits, processors, microprocessors, digital signal processors (DSPs), Application Specific Integrated Circuits (ASICs), computers, microcomputers, or combinations suitable for performing the operation, monitoring and control functions described above. In some instances, the controller has access to a memory that includes instructions to be executed by the controller during performance of the operation, control and monitoring functions. Although the electronics are illustrated as a single component in a single location, the electronics can include multiple different components that are independent of one another and/or placed in different locations. Additionally, as noted above, all or a portion of the disclosed electronics can be included on the chip including electronics that are integrated with the chip.

Components on the LIDAR chip can be fully or partially integrated with the LIDAR chip. For instance, the integrated optical components can include or consist of a portion of the wafer from which the LIDAR chip is fabricated. A wafer that can serve as a platform for a LIDAR chip can include multiple layers of material. At least a portion of the different layers can be different materials. As an example, a silicon-on-insulator wafer that includes the buried layer 300 between the substrate 302 and the light-transmitting medium 304 as shown in FIG. 4. The integrated on-chip components can be formed by using etching and masking techniques to define the features of the component in the light-transmitting medium 304. For instance, the slab 318 that define the waveguides and the stop recess can be formed in the desired regions of the wafer using different etches of the wafer. As a result, the LIDAR chip includes a portion of the wafer and the integrated on-chip components can each include or consist of a portion of the wafer. Further, the integrated on-chip components can be configured such that light signals traveling through the component travel through one or more of the layers that were originally included in the wafer. For instance, the waveguide of FIG. 4 guides light signal through the light-transmitting medium 304 from the wafer. The integrated components can optionally include materials in addition to the materials that were present on the wafer. For instance, the integrated components can include reflective materials and/or a cladding.

Numeric labels such as first, second, third, etc. are used to distinguish different features and components and do not indicate sequence or existence of lower numbered features. For instance, a second component can exist without the presence of a first component and/or a third step can be performed before a first step. The light signals disclosed above each include, consist of, or consist essentially of light from the prior light signal(s) from which the light signal is derived. For instance, an incoming LIDAR signal includes, consists of, or consists essentially of light from the LIDAR input signal.

Although the LIDAR system is disclosed as using complex signals such as the complex data signal, the LIDAR system can also use real signals. As a result, the mathematical transform can be a real transform and the components associated with the generation and use of the quadrature components can be removed from the LIDAR system. As a result, the LIDAR system can use a single signal combiner. Additionally or alternately, a single light sensor can replace each of the balanced detectors.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. An imaging system, comprising:
a LIDAR system that includes a signal director that can direct an outgoing LIDAR signal to any one of multiple different alternate waveguides,
the outgoing LIDAR signal carrying a wavelength channel with a frequency that has a linearly chirped chirp cycle with multiple output periods, each of the alternate waveguides being associated with a different switch channel in that a light signal that includes light from the outgoing LIDAR signal directed to a particular one of the alternate waveguides can be characterized as carrying the switch channel associated with that alternate waveguide;
the LIDAR system being configured to output system output signals that include light from the outgoing LIDAR signal,
the system output signals carrying different switch channels;
the LIDAR system being configured to receive system return signals that include light from one of the system output signals after an object located outside of the system has received and reflected the system output signal;
the LIDAR system including a signal combiner that generates different composite signals by combining light from system return signals that carry different switch channels with a reference signal;
electronics that calculate LIDAR data from the frequency of one or more of the composite signals, the LIDAR data indicating a radial velocity and/or distance between the LIDAR system and one or more objects that are located outside of the LIDAR system;
the LIDAR system being configured to continue to generate a composite signal that carries a first one of the switch channels for a period of time after the imaging system has stopped outputting the system output signal that carries the first switch channel; and
the LIDAR system configured to operate the signal director so as to change the alternate waveguide to which the outgoing LIDAR signal is directed at an expiration of each output period.

2. The imaging system of claim 1, wherein the LIDAR system can direct the outgoing LIDAR signal to a different one of the alternate waveguides while still generating the LIDAR data from the frequency of the composite signal carrying the first switch channel.

3. The imaging system of claim 1, wherein the wavelength channel carried by the outgoing LIDAR signal is one of multiple different wavelength channels carried by the outgoing LIDAR signal.

4. The imaging system of claim 1, wherein the system output signals carry multiple different wavelength channels.

5. The imaging system of claim 4, wherein at least two of the wavelength channels carried by the system output signals have a frequency that is chirped at a different rate and/or in a different direction.

6. The imaging system of claim 4, wherein there is no overlap in the frequencies of the different wavelength channels carried by the system output signals.

7. The imaging system of claim 4, wherein the system output signals are concurrently incident on the same sample region in a field of view.

8. The imaging system of claim 1, wherein the signal combiner is one of multiple signal combiners included in the LIDAR system,
each of the signal combiners generates composite signals, and
the composite signals generated by different signal combiners carry a different one of the wavelength channels.

9. The imaging system of claim 8, wherein the electronics use beat frequencies of composite signals that carry different wavelength channels to calculate the LIDAR data for the sample region.

10. The imaging system of claim 1, wherein a direction that the system output signals travels away from the imaging system changes in response to operating the signal director so as to change the alternate waveguide that receives the outgoing LIDAR signal.

11. The imaging system of claim 10, wherein a beam director is configured to steer the system output signals in a field of view, a path of system output signal in the field of view having a contribution from the beam director and also from the signal director, the contribution of the beam director to the path being movement of the system output signal on a two-dimensional path back and forth across the field of view, and the contribution from the signal director to the path being movement of the system output signals transverse to the two-dimensional path contribution provided by the beam director.

12. The system of claim 11, wherein the beam director is a steerable mirror.

13. The system of claim 12, wherein the beam director is configured to concurrently scan the system output signal on a slow axis and a fast axis, the beam director scanning the system output signal on the slow axis such that a direction that the system output signal travels away from the LIDAR system changes at a slow angular rate, the beam director scanning the system output signal on the fast axis such that a direction that the system output signal travels away from the LIDAR system changes at a fast angular rate, a ratio of the fast angular rate to the slow angular rate being more than 2:1 and less than 200:1.

14. The system of claim 13, wherein the contribution of the beam director to the path is movement of the system output signal in a zigzag pattern.

15. The system of claim 1, wherein a duration of the linear chirp cycle is more than 2 and less than 100 times a duration of each one of the output periods.

16. The system of claim 1, wherein the duration of each output period is greater than 1 μs and less than 10 μs.

17. The system of claim 1, wherein each of the system output signals carries a different wavelength channel and each of the system output signals travels aways from the LIDAR system in the same direction.

18. The system of claim 1, wherein the LIDAR system is configured to operate the signal director such that the switch channel carried by the system output signals is different for output periods that are sequential in time.

* * * * *